(12) United States Patent
Ezawa et al.

(10) Patent No.: US 8,365,518 B2
(45) Date of Patent: Feb. 5, 2013

(54) CONSTRUCTION MACHINE

(75) Inventors: Masanori Ezawa, Tsukuba (JP);
Shouhei Kamiya, Kasumigaura (JP);
Takashi Hirose, Tsuchiura (JP); Yasushi Arai, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 337 days.

(21) Appl. No.: 12/920,831

(22) PCT Filed: May 9, 2009

(86) PCT No.: PCT/JP2009/058716
§ 371 (c)(1),
(2), (4) Date: Sep. 3, 2010

(87) PCT Pub. No.: WO2010/004805
PCT Pub. Date: Jan. 14, 2010

(65) Prior Publication Data
US 2011/0000199 A1    Jan. 6, 2011

(30) Foreign Application Priority Data
Jul. 10, 2008   (JP) ................................. 2008-180138

(51) Int. Cl.
*F01N 3/00* (2006.01)

(52) U.S. Cl. ................ 60/297; 60/280; 60/295; 60/311; 55/DIG. 30; 96/240; 96/241

(58) Field of Classification Search .................... 60/276, 60/280, 295, 297, 311; 55/370, DIG. 30; 96/240, 241
See application file for complete search history.

(56) References Cited

U.S. PATENT DOCUMENTS

| 4,867,768 | A | * | 9/1989 | Wagner et al. ................... 96/386 |
| 5,063,736 | A | * | 11/1991 | Hough et al. .................... 60/286 |
| 5,397,550 | A | * | 3/1995 | Marino, Jr. ..................... 422/178 |
| 6,941,750 | B2 | * | 9/2005 | Boretto et al. .................. 60/297 |
| 7,571,601 | B2 | * | 8/2009 | Lee ................................ 60/286 |
| 8,161,736 | B2 | * | 4/2012 | Tsukada et al. ................. 60/295 |
| 2003/0051449 | A1 | | 3/2003 | Nishiyama et al. |
| 2005/0188926 | A1 | | 9/2005 | Kimura et al. |

FOREIGN PATENT DOCUMENTS

| EP | 1 571 046 A1 | 9/2005 |
| JP | 4-32925 B2 | 6/1992 |
| JP | 4-330313 A | 11/1992 |
| JP | 2003-41627 A | 2/2003 |
| JP | 2003-90214 A | 3/2003 |
| JP | 2003-120277 A | 4/2003 |
| JP | 2005-120839 A | 5/2005 |
| JP | 2005-282362 A | 10/2005 |

* cited by examiner

Primary Examiner — Binh Q Tran
(74) Attorney, Agent, or Firm — Mattingly & Malur, PC

(57) ABSTRACT

An upstream cylinder (21) and a downstream cylinder (24) are fixedly mounted to a support member (19), and a filter cylinder (26) is provided mountably and dismountably between the cylinders (21) and (24). In consequence, only the filter cylinder (26) can be dismounted with the cylinders (21) and (24) left as they are on the support member (19), so that the maintenance operation of a particulate matter removing filter (28) can be performed easily. In addition, pressure conduits (32) and (33) and a pressure sensor (34) of a pressure detection unit (31) for detecting a clogged state of the particulate matter removing filter (28) are disposed at positions offset from a moving path (30) of the filter cylinder (26). In consequence, only the filter cylinder (26) can be easily mounted or dismounted without being obstructed by the pressure conduits (32) and (33) and the pressure sensor (34).

8 Claims, 18 Drawing Sheets

CONSTRUCTION MACHINE

TECHNICAL FIELD

The present invention relates to a construction machine such as a hydraulic excavator, and more particularly to a construction machine equipped with an exhaust gas purifying device for purifying exhaust gas from an engine.

BACKGROUND ART

Generally, a hydraulic excavator as a typical example of construction machines is constituted by an automotive lower traveling structure, an upper revolving structure which is swingably mounted on the lower traveling structure, and a working mechanism liftably mounted on the front side of the upper revolving structure. An engine for driving a hydraulic pump is mounted on a rear portion of a revolving frame of the upper revolving structure, and an exhaust gas purifying device for purifying exhaust gas by removing harmful substances in the exhaust gas is provided in an exhaust pipe of the engine.

Further, as an exhaust gas purifying device which is provided in a hydraulic excavator, a device is known which has a particulate matter removing filter (generally called a diesel particulate filter, abbreviated as DPF) for trapping and removing particulate matter (PM) in exhaust gas (Patent Literature 1: Japanese Patent Laid-Open No. 2003-120277 A).

The exhaust gas purifying device according to this Patent Literature 1, for example, is constituted by connecting in series an upstream cylinder connected to an exhaust pipe, a downstream cylinder which is disposed downstream of the upstream cylinder and from which exhaust gas is discharged, and a filter cylinder provided between the upstream cylinder and the downstream cylinder and incorporating a particulate matter removing filter therein. The exhaust gas purifying device has the filter cylinder fixed to the engine side, and the upstream cylinder and the downstream cylinder are detachably mounted on the filter cylinder. The particulate matter removing filter incorporated in the filter cylinder traps the particulate matter in the exhaust gas, and in the case where a predetermined amount of particulate matter has been trapped, the accumulated particulate matter is removed by burning it.

Accordingly, the exhaust gas purifying device is provided with pressure conduits which are respectively connected to the upstream side and the downstream side of the particulate matter removing filter in such a manner as to sandwich the particulate matter removing filter as well as a pressure sensor for detecting the upstream side pressure and the downstream side pressure supplied by the pressure conduits. In consequence, the exhaust gas purifying device detects the amount of particulate matter trapped (the clogged state) by the particulate matter removing filter from the pressure differential between the upstream side pressure and the downstream side pressure (Patent Literature 2: Japanese Patent Laid-Open No. 2005-120839 A).

Meanwhile, the particulate matter removing filter removes the particulate matter by burning it, but ash after burning gradually deposits. For this reason, with the pressure sensor of Patent Literature 1, the upstream cylinder and the downstream cylinder are detachably mounted on the filter cylinder incorporating the particulate matter removing filter so that the ash deposited in the particulate matter removing filter can be cleaned.

Nevertheless, according to the device according to Patent Literature 1, the filter cylinder incorporating the particulate matter removing filter is fixedly mounted to the engine.

Accordingly, in the case where the ash deposited in the particulate matter removing filter is cleaned, the filter cylinder together with the upstream cylinder and the downstream cylinder must be dismounted from the engine, and the filter cylinder must be dismounted from the upstream cylinder and the downstream cylinder. For this reason, there is a problem in that much time and trouble are required in the cleaning operation of the particulate matter removing filter.

In addition, the exhaust gas purifying device is generally disposed in the vicinity of the engine in order that the exhaust gas can be treated in a high-temperature state. However, in the case of the hydraulic excavator, numerous equipments and parts, including a counterweight, a tank, a hydraulic pump, a hydraulic pipe, and a firewall partitioning the engine and the hydraulic pipe and the like, are disposed around the engine. Therefore, the counterweight, the tank, the engine, the firewall, and the like are disposed around and below the exhaust gas purifying device.

For this reason, the filter cylinder of the exhaust gas purifying device is dismounted by being moved upward and is remounted by being moved downward after the maintenance. In addition, the pressure sensor and the pressure conduits are generally mounted on the upper side of the exhaust gas purifying device in order that they are easily accessible in view of workability such as the connecting operation of the piping and the maintenance operation.

However, in the case where the pressure sensor and the pressure conduits are mounted on the upper side of the exhaust gas purifying device, the pressure sensor and the pressure conduits serve as obstacles when the exhaust gas purifying device is mounted or dismounted in the vertical direction. For this reason, it is necessary to dismount the pressure sensor, the pressure conduits, and the like in advance of the dismounting of the filter cylinder, and hence there is a problem in that the workability in the cleaning operation of the particulate matter removing filter deteriorates appreciably.

DISCLOSURE OF THE INVENTION

In view of the above-described problems with the prior art, it is an object to provide a construction machine in which, even if the pressure sensor and the pressure conduits are provided in the vicinities of the exhaust gas purifying device, only the filter cylinder can be easily mounted and dismounted without moving the upstream cylinder and the downstream cylinder, to thereby facilitate the maintenance operation of the filter within the filter cylinder.

(1) A construction machine in accordance with the present invention includes an automotive vehicle body, an engine mounted on the vehicle body, a hydraulic pump provided on one longitudinal side of the engine, and an exhaust gas purifying device connected to the engine through an exhaust pipe to purify exhaust gas, and the exhaust gas purifying device comprising an upstream cylinder connected to the exhaust pipe, a downstream cylinder disposed downstream of the upstream cylinder to emit the exhaust gas, a filter cylinder provided between the upstream cylinder and the downstream cylinder and accommodating a filter for trapping particulate matter contained in the exhaust gas, an upstream side pressure conduit mounted on the upstream cylinder to guide pressure within the upstream cylinder to an outside, a downstream side pressure conduit mounted on the downstream cylinder to guide pressure within the downstream cylinder to the outside, and a pressure sensor connected to these conduits to detect the front and rear pressures of the filter.

Further, to overcome the above-described problems, a characteristic feature of the present invention lies in that the upstream cylinder and the downstream cylinder are fixedly provided on the vehicle body, the filter cylinder is provided mountably and dismountably with respect to the upstream cylinder and the downstream cylinder, and the upstream side pressure conduit, the downstream side pressure conduit and the pressure sensor are arranged to be disposed at positions offset from a moving path which is used when the filter cylinder is dismounted from the upstream cylinder and the downstream cylinder and is moved to another location or is returned from the other location and is remounted thereto so as to perform maintenance operation of the filter cylinder.

With this construction, since the filter cylinder can be mounted to and dismounted from the upstream cylinder and the downstream cylinder which are fixed to the vehicle body side, only the filter cylinder can be dismounted with the upstream cylinder and the downstream cylinder left on the vehicle body side. As a consequence, since only the dismounted filter cylinder can be moved to another location, the maintenance operation of the filter, including such as the inspection operation, cleaning operation, and repair operation, can be easily performed at this location.

Moreover, when the maintenance operation of the filter is performed, it is necessary to move the filter cylinder. In this case, however, the upstream side pressure conduit, the downstream side pressure conduit, and the pressure sensor are disposed at positions offset from the moving path which serves as a passage when the filter cylinder is moved. Accordingly, even in cases where the filter cylinder is mounted or dismounted for the purpose of maintenance operation, the upstream side pressure conduit, the downstream side pressure conduit, and the pressure sensor do not serve as obstacles, and there is no need to dismount these parts.

As a result, since even in a case where the exhaust gas purifying device is accommodated in a narrow space, only the filter cylinder can be easily mounted to and dismounted from the upstream cylinder and the downstream cylinder, so that it is possible to easily perform the maintenance operation of the filter incorporated in the filter cylinder. In addition, since the upstream side pressure conduit, the downstream side pressure conduit, and the pressure sensor can be easily inspected visually and can be disposed at easily accessible positions if they are located at positions offset from the moving path of the filter cylinder, it is possible to improve workability in such as the assembling operation and the maintenance operation.

(2) In this case, according to the present invention, the vehicle body is provided with a partition member for partitioning between an engine side space formed on a side of the engine and a pump side space formed on a side of the hydraulic pump so as to prevent hydraulic oil from scattering from the pump side space to the engine side space, the exhaust gas purifying device being disposed in the engine side space partitioned by the partition member, and the moving path for moving the filter cylinder being arranged to be formed between the partition member and the engine.

With this construction, for example, the partition member is capable of preventing hydraulic oil which leaked in the pump side space from scattering to the high-temperature engine side space, making it possible to improve safety, reliability, and the like. In addition, even in the case where the partition member is provided, the moving path for moving the filter cylinder can be formed between the partition member and the engine. In consequence, the filter cylinder can be moved through the moving path to another location for performing the maintenance operation, or can be returned from the other location.

(3) According to the present invention, the partition member is disposed so as to extend vertically, and the moving path for moving the filter cylinder is arranged to be formed by a vertical space between the partition member and the engine.

By this construction, the vertical space between the partition member and the engine can be used as the moving path for moving the filter cylinder. As a consequence, even in the narrow space between the partition member and the engine, the filter cylinder can be dismounted from the upstream cylinder and the downstream cylinder by upwardly moving the filter cylinder along the moving path. Meanwhile, as the filter cylinder is moved downward, the filter cylinder can be remounted between the upstream cylinder and the downstream cylinder.

(4) According to the present invention, the engine is provided with a support member for mounting the exhaust gas purifying device, the upstream cylinder and the downstream cylinder are fixedly mounted on the support member in a state in which an insertion space for the filter cylinder is secured, and the pressure sensor is arranged to be mounted on the support member at the position offset from the moving path of the filter cylinder.

In consequence, if the engine is provided with the support member, the upstream cylinder and the downstream cylinder of the exhaust gas purifying device can be fixedly mounted on this support member in a state in which an insertion space for the filter cylinder is secured. In addition, since the pressure sensor is mounted on the support member, this pressure sensor can be disposed on the same vibration system as that of the cylinders. As a consequence, it is possible to prolong the service lives of the conduits connecting the pressure sensor and the cylinders.

(5) According to the present invention, the pressure sensor is arranged to be mounted on either one of the upstream cylinder and the downstream cylinder at the position offset from the moving path of the filter cylinder. In consequence, by mounting the pressure sensor by making use of either one of the upstream cylinder and the downstream cylinder, it is unnecessary to newly provide a large bracket or a bracket with a complex shape, so that the pressure sensor can be installed with a simple construction.

(6) Meanwhile, according to the present invention, the upstream side pressure conduit and the downstream side pressure conduit are arranged to be provided along outer peripheral sides of the upstream cylinder, the filter cylinder, and the downstream cylinder at the positions offset from the moving path of the filter cylinder. In consequence, the upstream side pressure conduit and the downstream side pressure conduit do not serve as obstacles at the time of moving the filter cylinder, and the overall exhaust gas purifying device can be formed compactly.

(7) Further, according to the present invention, the vehicle body is provided with a partition member for partitioning between an engine side space formed on a side of the engine and a pump side space formed on a side of the hydraulic pump so as to prevent hydraulic oil from scattering from the pump side space to the engine side space, and the partition member is formed by a bottom plate portion extending over an upper side of the hydraulic pump in a direction away from the engine and a vertical plate portion extending upward from that end portion of the bottom plate portion which is located away from the engine. Further, the engine is provided with a support member for supporting the exhaust gas purifying device, and the support member is formed by a mounting portion which is fixed to the engine and a purifying device supporting portion extending from the mounting portion in a direction away from the engine over an upper side of the bottom plate portion of the partition member, the exhaust gas purifying device being mounted on the purifying device supporting portion of the support member, the moving path being formed in the engine side space between the vertical plate portion of the partition member and the engine, and the pressure sensor being arranged to be mounted on any one of the support member, the upstream cylinder, and the downstream cylinder at the position offset from the moving path of the filter cylinder.

By this configuration, the engine side space and the pump side space can be partitioned from each other by the partition member constituted by the bottom plate portion and the vertical plate portion, and it is possible to prevent the hydraulic oil from scattering from the pump side space to the engine side space. In addition, the exhaust gas purifying device can be mounted on the engine by means of the support member. In consequence, the moving path can be formed between the vertical plate portion of the partition member and the engine. In addition, the pressure sensor can be installed by using any one of the support member, the upstream cylinder, and the downstream cylinder.

(8) Furthermore, according to the present invention, there is provided a mounting frame provided on the vehicle body to dispose the partition member above the hydraulic pump, the mounting frame is constituted by a rectangular frame portion for holding the partition member from therearound and a plurality of leg portions extending downward from the frame portion and fixed to the vehicle body, and the moving path is in a range surrounded by the frame portion of the mounting frame. In consequence, the partition member can be held by the frame portion of the mounting frame, and the moving path of the filter cylinder can be provided within the frame portion of the mounting frame.

DESCRIPTION OF REFERENCE NUMERALS

Figure 1:
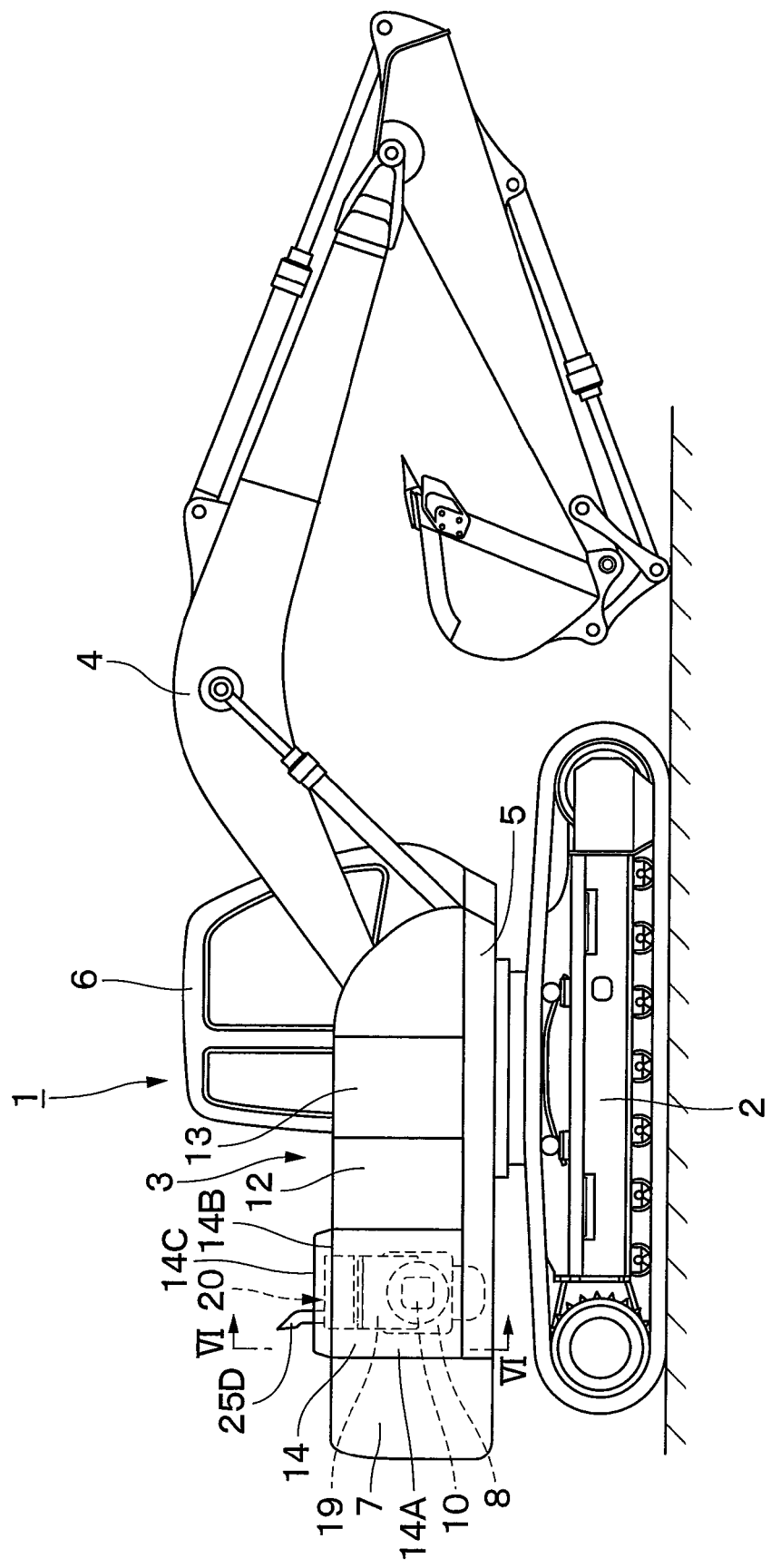
FIG. 1 is a front view illustrating a hydraulic excavator which is applied to a first embodiment of the invention.

1: Hydraulic excavator
2: Lower traveling structure (vehicle body)
3: Upper revolving structure (vehicle body)
8: Engine
8E: Exhaust pipe
10: Hydraulic pump
15: Mounting frame
15A: Frame portion
15B: Leg portion
16: Partition member
16A: Bottom plate portion
16B: Vertical plate portion
17: Engine side space
18: Pump side space
19: Support member
19A: Mounting portion
19B: Purifying device supporting portion
19C, 52, 62: Bracket
20, 41, 51, 61, 71: Exhaust gas purifying device
21, 42: Upstream cylinder
22, 25, 27: Cylindrical case
24, 43: Downstream cylinder
26: Filter cylinder
28: Particulate matter removing filter
30: Moving path
31, 53, 63: Pressure detection unit
32, 54, 64: Upstream side pressure conduit
33, 55, 65: Downstream side pressure conduit
34, 56, 66: Pressure sensor
S: Insertion space

BEST MODE FOR CARRYING OUT THE INVENTION

Hereafter, with reference to the accompanying drawings, the present invention of the construction machine is described more particularly by way of its preferred embodiment which are applied by way of example to a hydraulic excavator.

FIGS. 1 to 13 show a first embodiment of the present invention. In FIG. 1, designated at 1 is a crawler type hydraulic excavator which is a typical example of construction machines, and the hydraulic excavator 1 is largely constituted by an automotive lower traveling structure 2, an upper revolving structure 3 which is swingably mounted on the lower traveling structure 2 and constitutes a vehicle body together with the lower traveling structure 2, and a working mechanism 4 liftably mounted on the front side of the upper revolving structure 3 to perform such as the operation of excavating earth and sand. Further, the lower traveling structure 2 and the upper revolving structure 3 are specific examples of the vehicle body in accordance with the invention.

Here, with reference to FIGS. 1 to 7, a detailed description will be given of the upper revolving structure 3 for constituting the hydraulic excavator 1.

Figure 2:
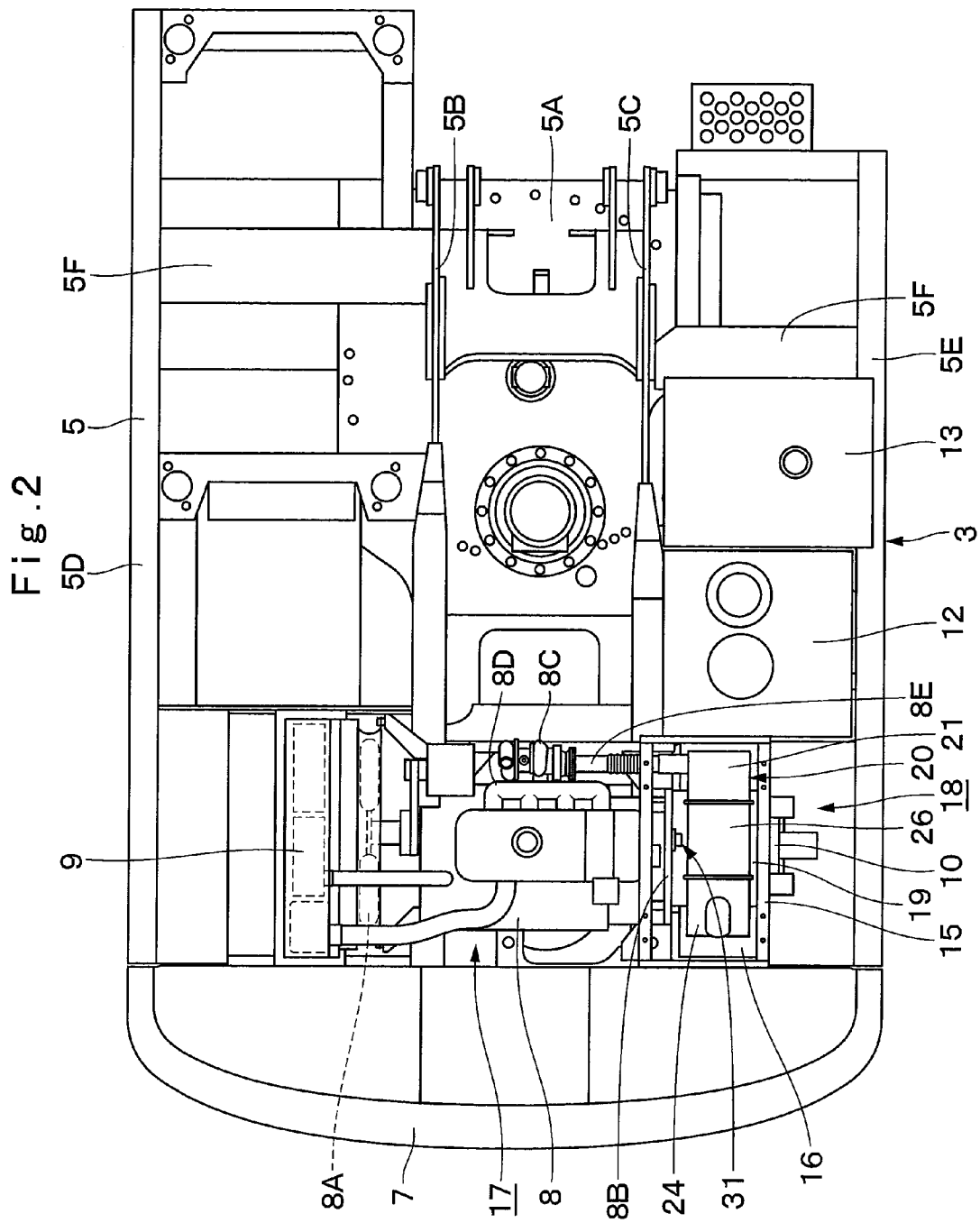
FIG. 2 is a plan view illustrating in enlarged form an upper revolving structure in FIG. 1 by omitting a cab, a housing cover, and a working mechanism.

Indicated at 5 is a revolving frame of the upper revolving structure 3, and the revolving frame 5 constitutes a support structure of the upper revolving structure 3. As shown in FIG. 2, the revolving frame 5 is largely constituted by a bottom plate 5A formed of a thick-walled steel plate or the like extending in the front and rear directions, a left vertical plate 5B and a right vertical plate 5C erected on the bottom plate 5A and extending in the front and rear directions with a predetermined interval therebetween in the left and right directions, a left side frame 5D and a right side frame 5E each disposed at an interval with the respective one of the vertical plates 5B and 5C to the left direction or to the right direction and extending in the front and rear directions, and a plurality of extension beams 5F extending from the bottom plate 5A and the respective one of the vertical plates 5B and 5C in the left and right directions and adapted to support the left and right side frames 5D and 5E at their distal end portions. Further, the working mechanism 4 is liftably mounted on the front side of the left and right vertical plates 5B and 5C by being located in the center in the left and right directions, and a below-described engine 8 and the like are provided on the rear side of the revolving frame 5.

Indicated at 6 is a cab (see FIG. 1) which is mounted on the left front side of the revolving frame 5 (on the left side of a foot portion of the working mechanism 4) and in which an operator rides. Disposed in its interior are an operator's seat in which the operator is seated, an operation lever for traveling, an operation lever for work operation, and the like (none are shown).

Indicated at 7 is a counterweight which is mounted on a rear end portion of the revolving frame 5. This counterweight 7 is for keeping a weight balance with the working mechanism 4 and projects such that its rear surface side is curved, as shown in FIG. 2.

Figure 4:
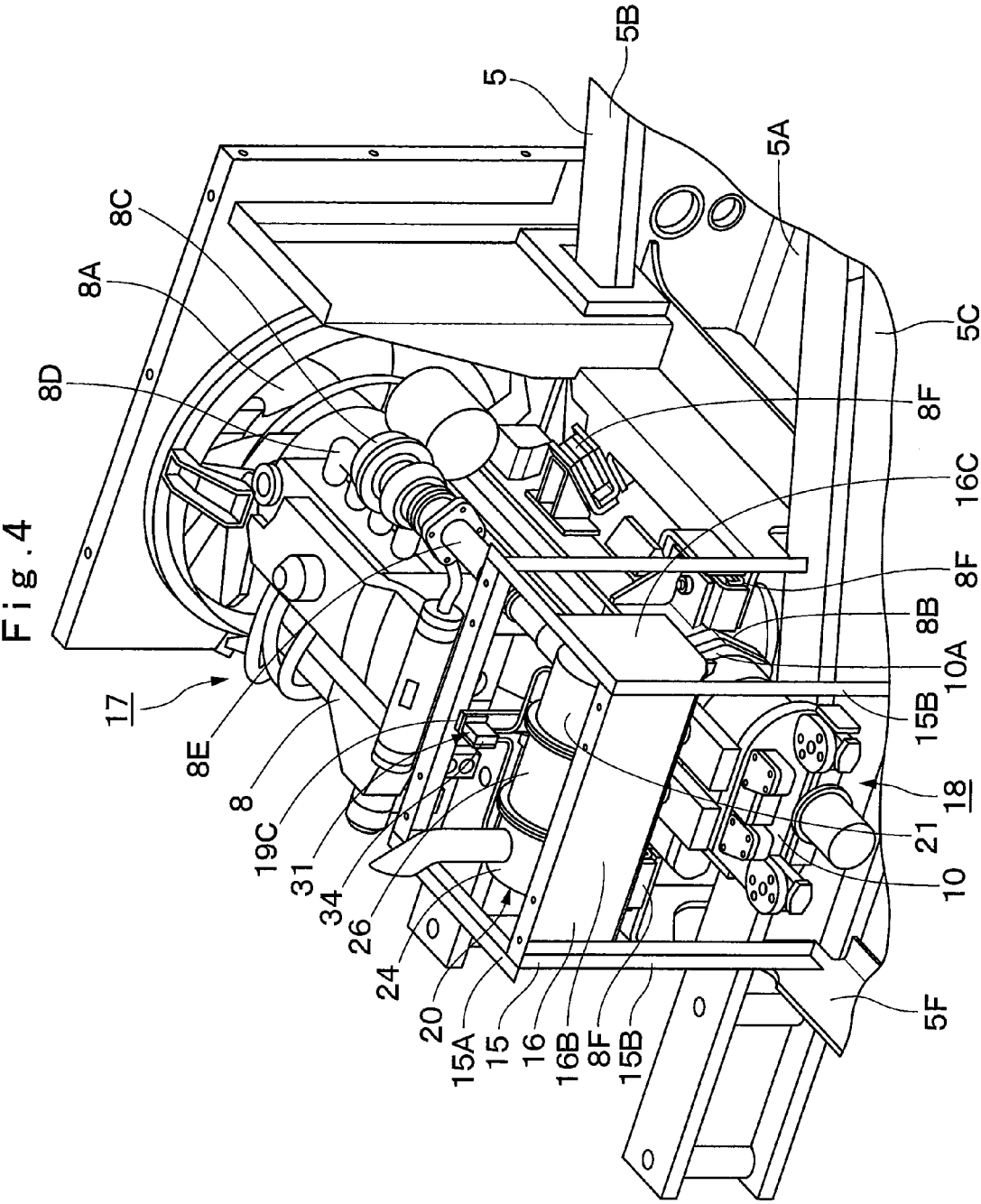
FIG. 4 is an enlarged perspective view of the essential portions illustrating the engine, the exhaust gas purifying device, and their vicinities together with portions of a revolving frame.
Figure 5:
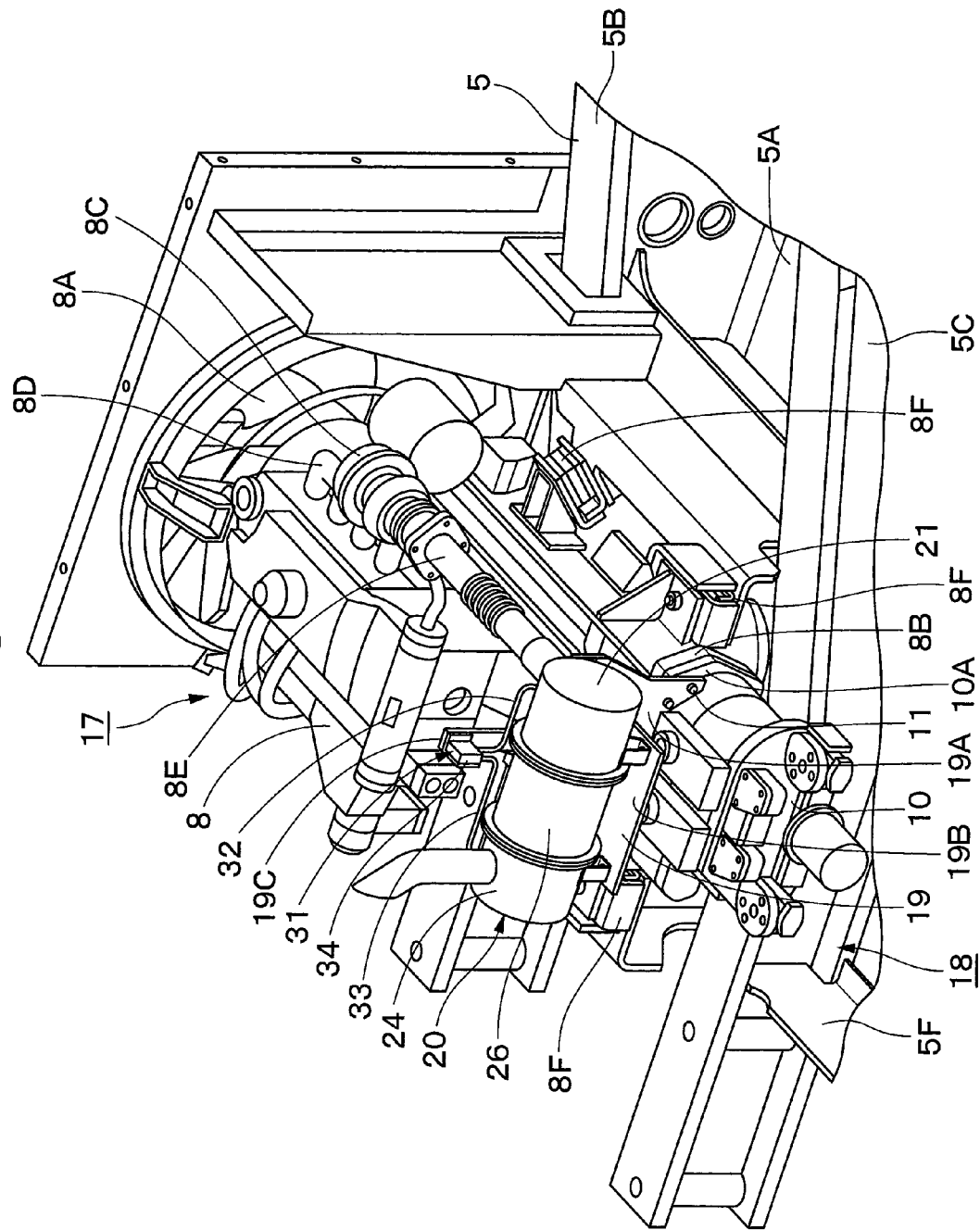
FIG. 5 is an enlarged perspective view of the essential portions in a position similar to that in FIG. 4, and illustrating the engine and the exhaust gas purifying device by omitting a mounting frame and a partition member.

Indicated at 8 is an engine which is provided on the rear side of the revolving frame 5. The engine 8 constitutes a part of the vehicle body and is mounted in a transversely mounted state in which it extends in the left and right directions by being located on the front side of the counterweight 7. As shown in FIGS. 4 and 5, a cooling fan 8A for supplying cooling air to below-described heat exchanger 9 is provided on the left side of the engine 8.

Meanwhile, the right side, i.e., one longitudinal end, of the engine 8 is formed as a pump mounting portion 8B for mounting a below-described hydraulic pump 10. A supercharger 8C such as a turbocharger for increasing the flow rate of intake air is provided on an upper portion of the front side of the engine 8 by being connected to an exhaust manifold 8D, and an exhaust pipe 8E is connected to the supercharger 8C in such a manner as to extend in the left and right directions. Further, the engine 8 is supported by the revolving frame 5 in a vibration isolated state by means of, for example, four vibration isolating members 8F (only three are shown in FIG. 5).

Denoted at 9 is the heat exchanger (see FIG. 2) disposed on the left side of the engine 8, and the heat exchanger 9 is provided in face-to-face relation to the cooling fan 8A. The heat exchanger 9 is constituted by such as a radiator for cooling engine cooling water, an oil cooler for cooling hydraulic oil, and an intercooler for cooling the air which is sucked for the engine 8.

Indicated at 10 is the hydraulic pump disposed on the right side of the engine 8, and the hydraulic pump 10 is driven by the engine 8 to thereby deliver hydraulic oil supplied from a below-described operating oil tank 12 as pressurized oil. Further, as shown in such as FIGS. 5 and 6, a flange portion 10A is formed on the proximal end side of the hydraulic pump 10, and this flange portion 10A is mounted to the pump mounting portion 8B of the engine 8 by use of a plurality of bolts 11. When the hydraulic pump 10 is mounted to the engine 8 by the bolts 11, a mounting portion 19A of a below-described support member 19 is mounted together with the hydraulic pump 10.

Indicated at 12 is the operating oil tank (see FIG. 2) which is mounted on the right side of the revolving frame 5 by being located on the front side of the hydraulic pump 10. This operating oil tank 12 stores hydraulic oil for driving the lower traveling structure 2, the working mechanism 4, and the like. Additionally, indicated at 13 is a fuel tank which is provided on the front side of the operating oil tank 12.

Indicated at 14 is a housing cover (see FIG. 1) for covering the engine 8, the heat exchanger 9, an exhaust gas purifying device 20, and the like. The housing cover 14 is largely constituted by a left side cover (not shown) covering a side of the heat exchanger 9 by being located on the left side of the upper revolving structure 3, a right side cover 14A covering a side of the hydraulic pump 10 by being located on the right side of the upper revolving structure 3, and a top cover 14B covering the upper side of the engine 8 and the like. In addition, an engine cover 14C is openably provided at the top cover 14B to close an opening (not shown) for maintenance operation.

Indicated at 15 is a mounting frame which is provided on the revolving frame 5 so as to dispose a below-described partition member 16 above the hydraulic pump 10. This mounting frame 15 is constituted by a rectangular (oblong) frame portion 15A for holding an upper end side of the partition member 16 from therearound and a plurality of, e.g., four, leg portions 15B extending downward from the corners of the frame portion 15A and fixed to the revolving frame 5. The frame portion 15A and the leg portions 15B of the mounting frame 15 surround the exhaust gas purifying device 20 and the below-described support member 19 from therearound, and a below-described moving path 30 is in the range surrounded by this frame portion 15A.

Figure 6:
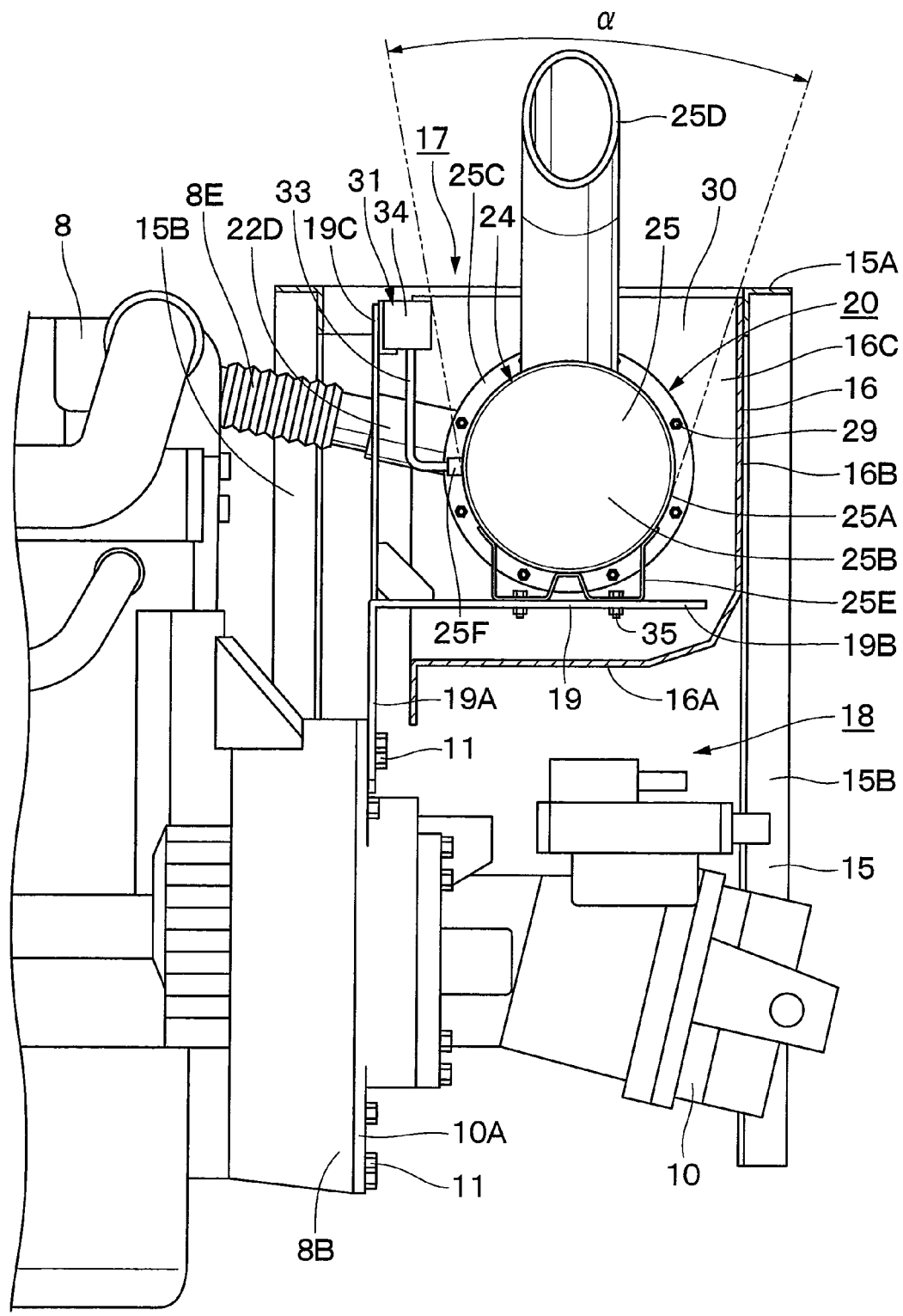
FIG. 6 is an enlarged cross-sectional view of the engine, a support member, the partition member, and the exhaust gas purifying device, taken from the direction of arrows VI-VI in FIG. 1.

Denoted at 16 is the partition member called a firewall which is provided on the right side of the engine 8 by being located within the housing cover 14. This partition member 16 is mounted on the revolving frame 5 by means of the mounting frame 15 and partitions between the engine 8 and the hydraulic pump 10. As shown in FIG. 6, the partition member 16 is largely constituted by a bottom plate portion 16A extending horizontally in a direction away from the engine 8 between the hydraulic pump 10 and a purifying device supporting portion 19B of the support member 19, a vertical plate portion 16B extending upward from a rear end (an end portion in the direction away from the engine 8) of that bottom plate portion 16A, and a front plate portion 16C provided so as to close front ends of the bottom plate portion 16A and the vertical plate portion 16B (see FIGS. 9 and 10).

The partition member 16 provided on the mounting frame 15 partitions between the engine 8 and the hydraulic pump 10 by providing a shield therebetween by means of the bottom plate portion 16A and the vertical plate portion 16B. In consequence, as shown in FIG. 6, an engine side space 17 where the engine 8, the exhaust gas purifying device 20, and the like are disposed and a pump side space 18 where the hydraulic pump 10 is disposed are formed within the housing cover 14 by means of the partition member 16. Accordingly, even in cases where leakage of the hydraulic oil has occurred in the surroundings of the hydraulic pump 10, the partition member 16 can prevent the leaked hydraulic oil from scattering to the engine 8 side, thereby making it possible to prevent a fire and the like.

Figure 7:
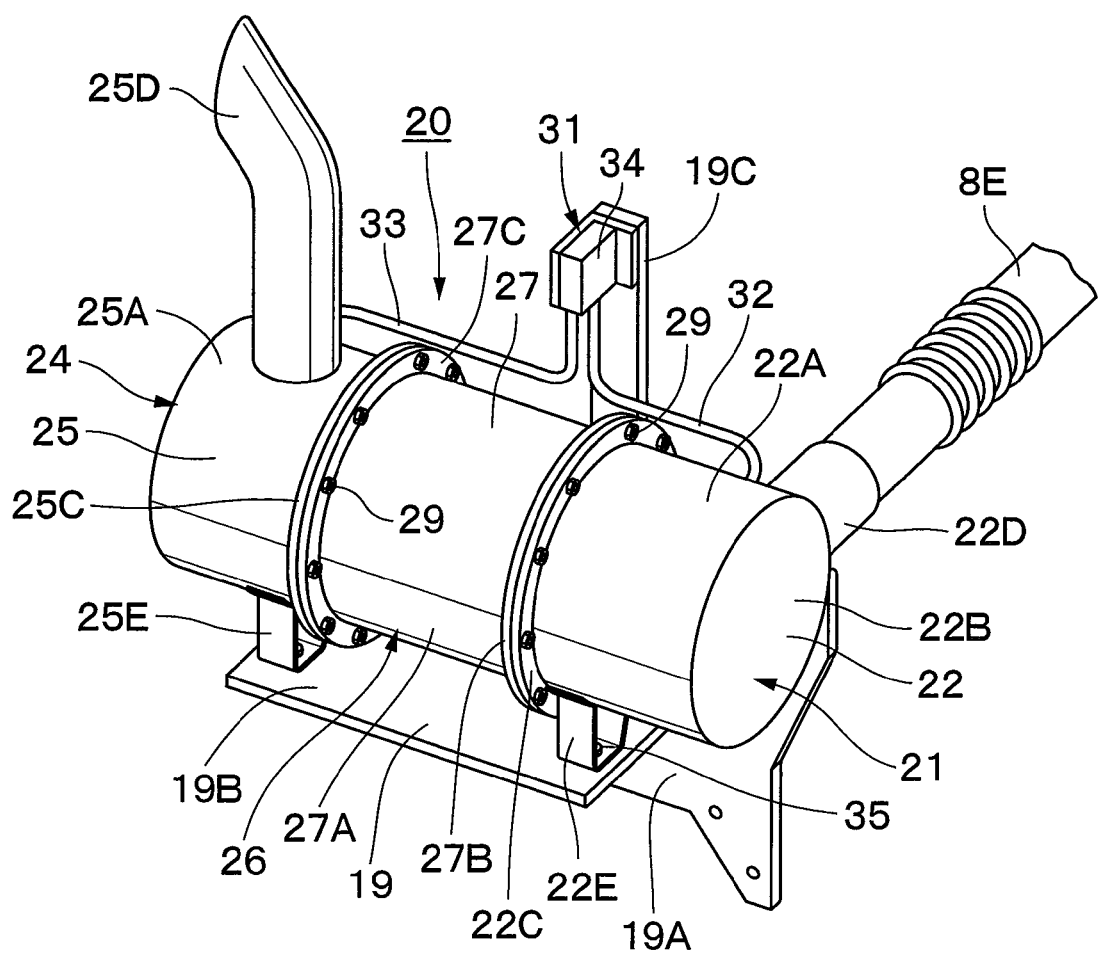
FIG. 7 is an enlarged perspective view of the exhaust gas purifying device in accordance with a first embodiment in a state in which the exhaust gas purifying device is mounted on the support member.
Figure 8:
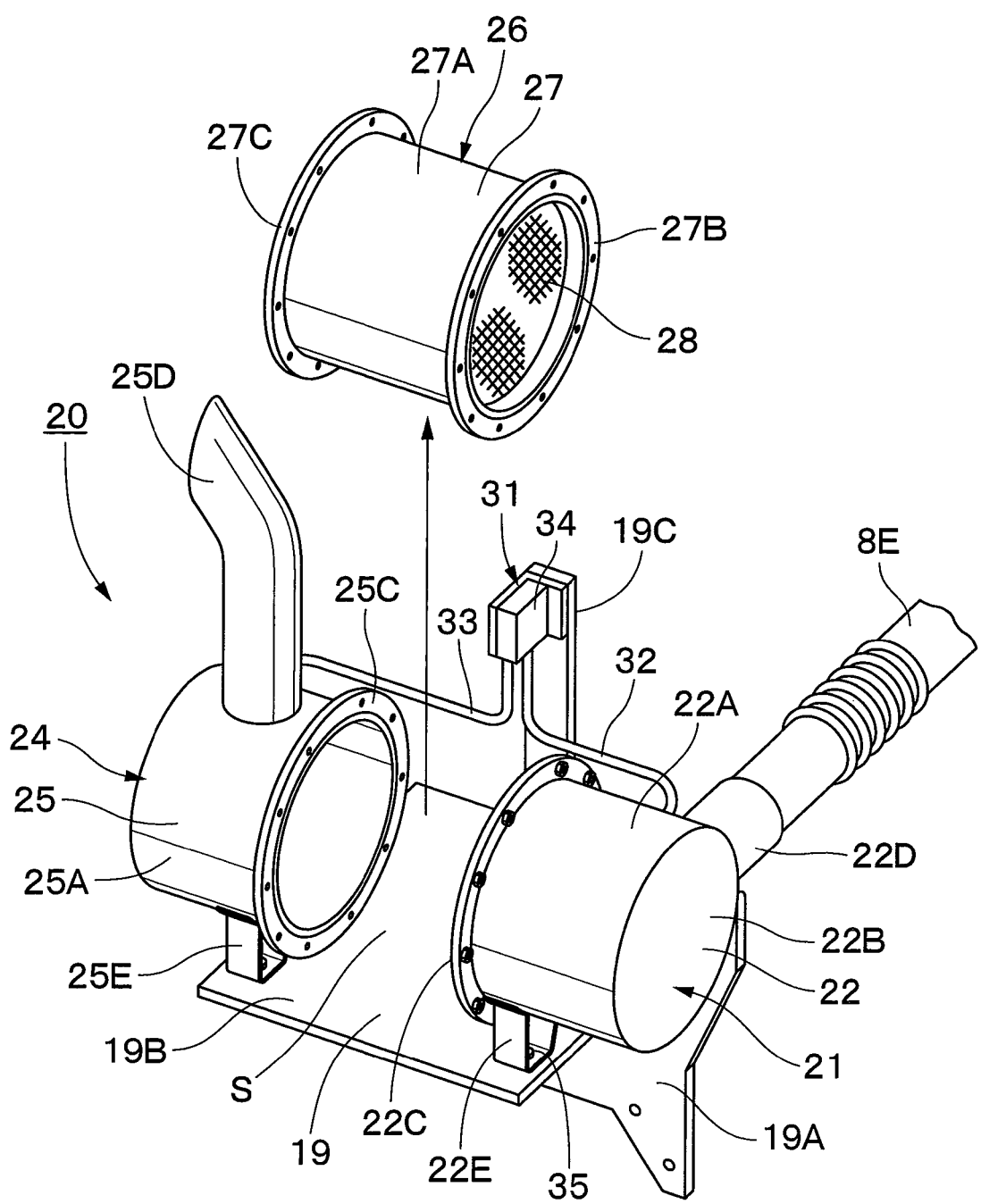
FIG. 8 is an exploded perspective view of the exhaust gas purifying device in a position similar to that in FIG. 7, and illustrating a state in which a filter cylinder is dismounted from an upstream cylinder and a downstream cylinder through a moving path.
Figure 9:
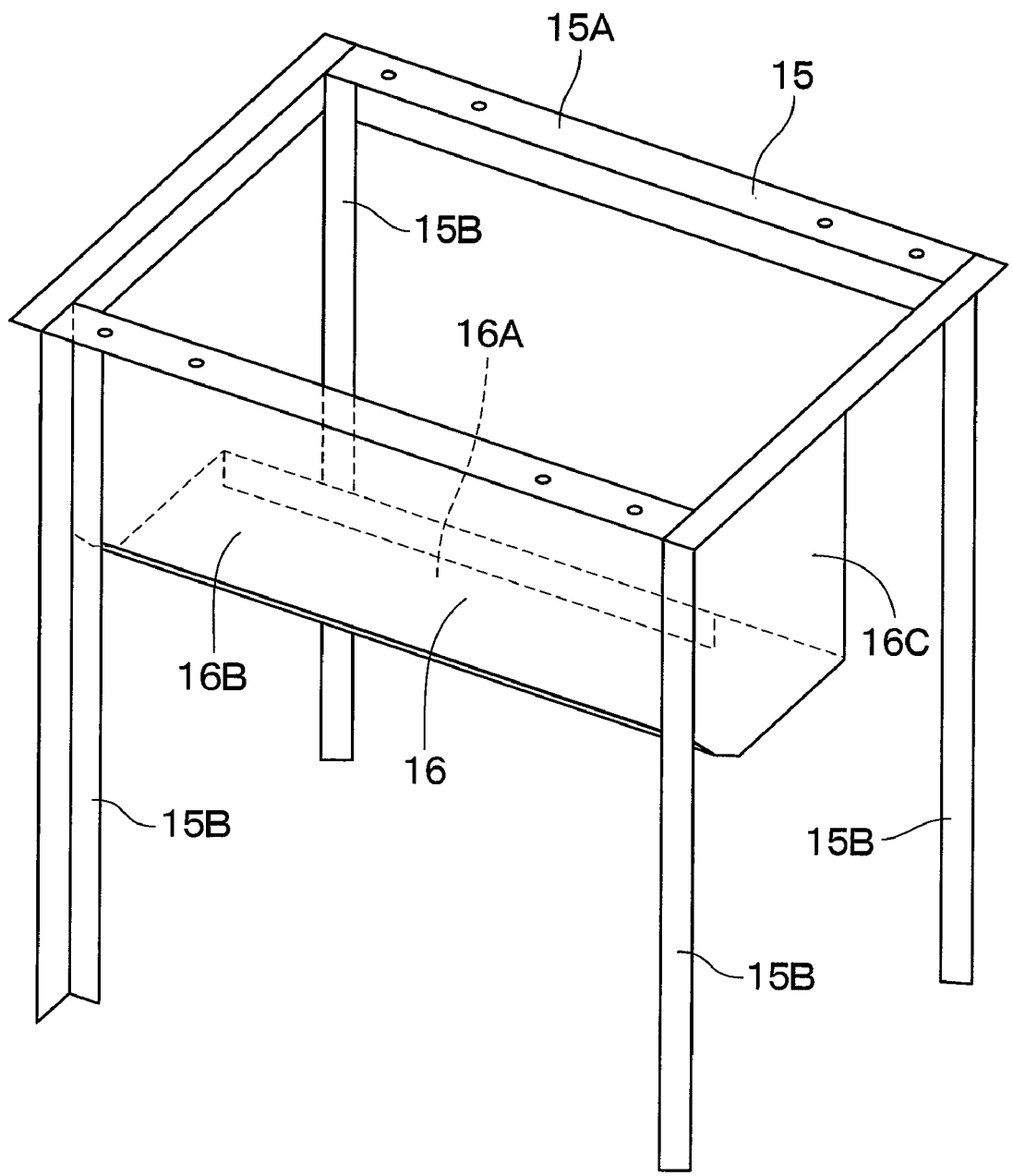
FIG. 9 is an external perspective view of the mounting frame and the partition member, taken from the opposite side to the engine.
Figure 10:
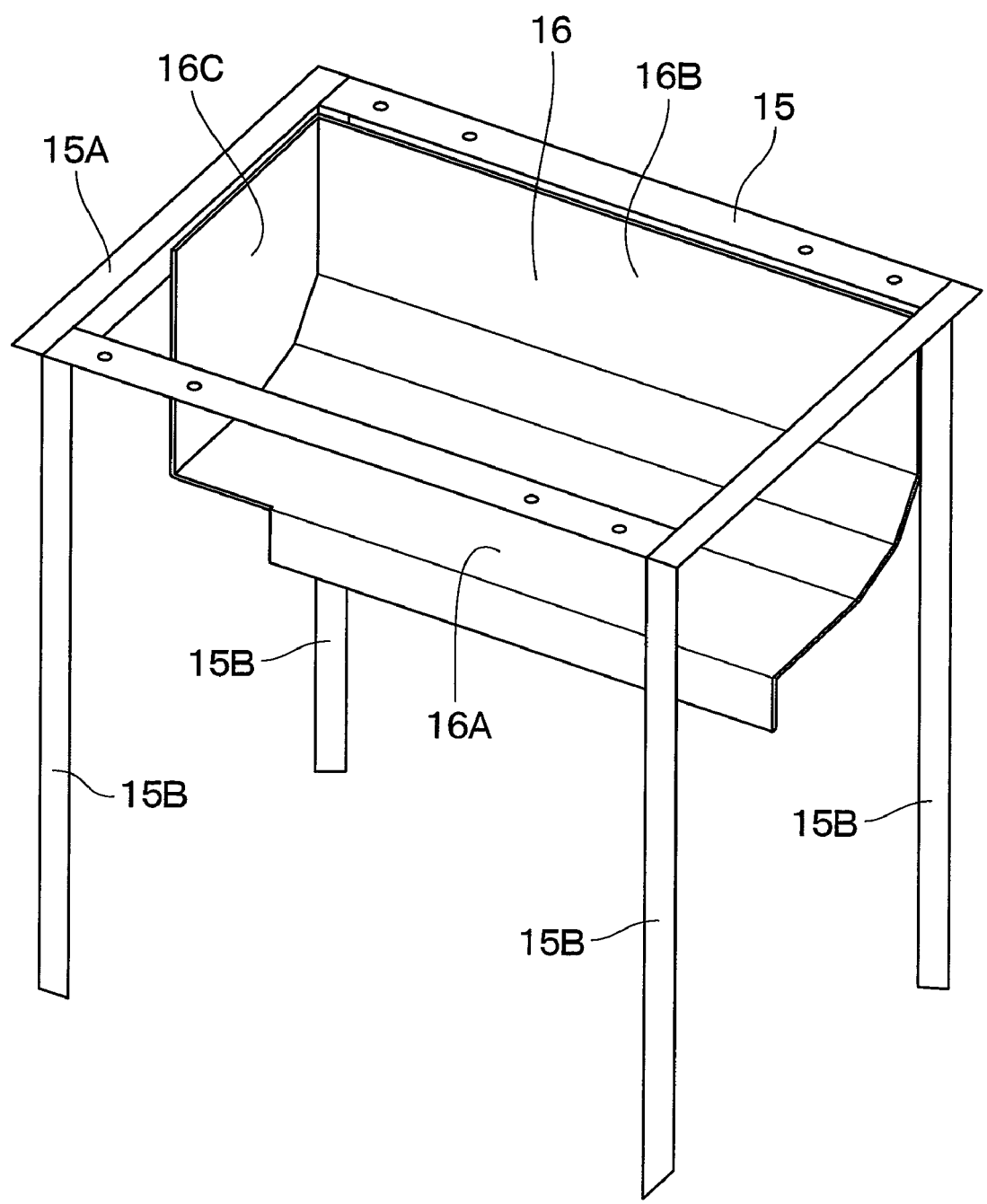
FIG. 10 is an external perspective view of the mounting frame and the partition member, taken from the engine side.
Figure 11:
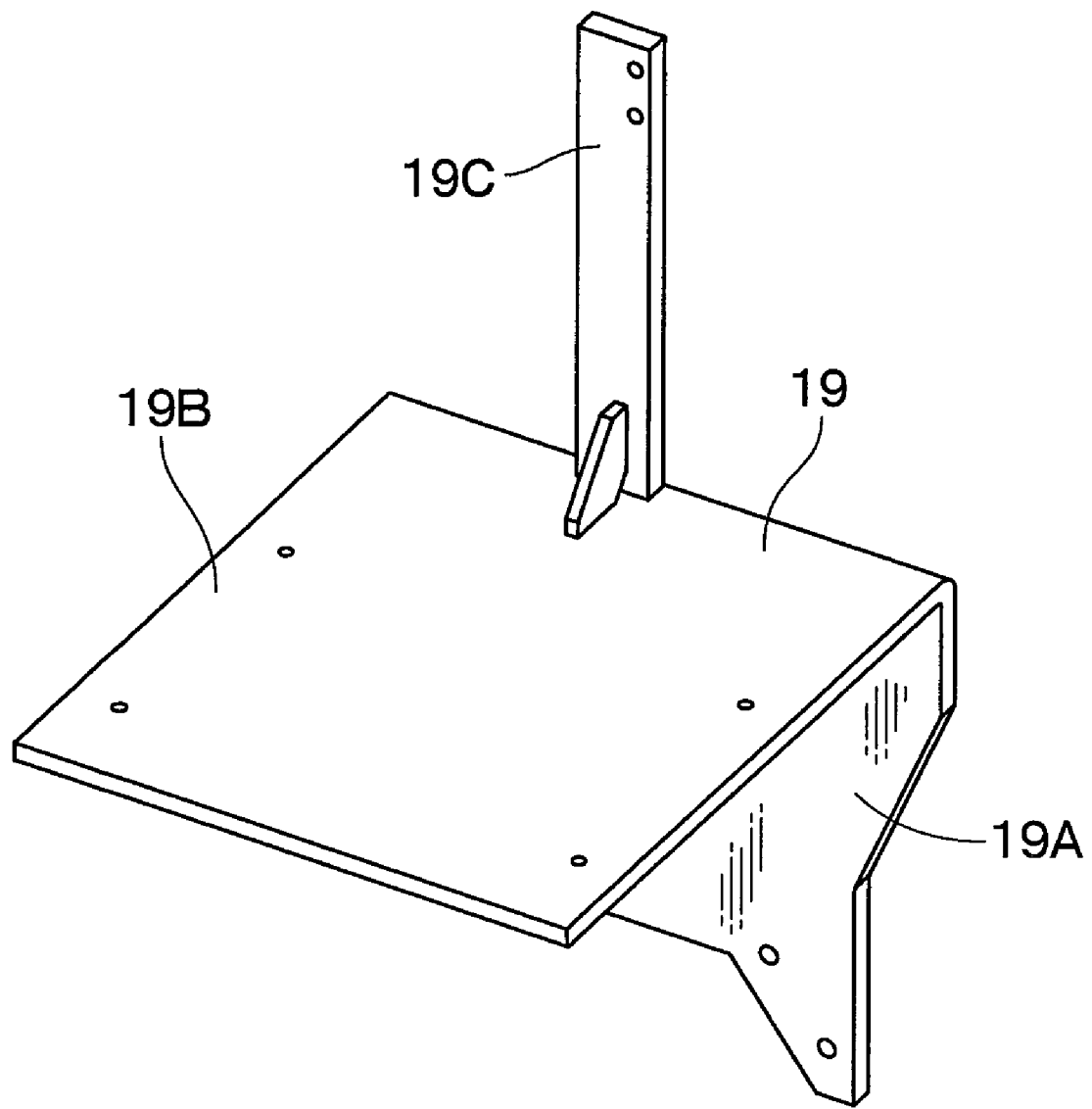
FIG. 11 is an external perspective view illustrating the support member as a single unit.

Designated at 19 is the support member which is provided on the right side of the engine 8 by being located on the upper side of the hydraulic pump 10. As shown in FIGS. 6 to 8, this support member 19 is formed as a substantially inverse L-shaped supporting base to support the below-described exhaust gas purifying device 20 in the engine side space 17. As shown in FIGS. 6 and 11, the support member 19 is constituted by the mounting portion 19A which is located on the left side, i.e., the engine 8 side, by being mounted on the engine 8 in such a manner as to extend substantially vertically and by the purifying device supporting portion 19B extending from the mounting portion 19A substantially horizontally in a rightward direction (in a direction away from the engine 8). Further, the mounting portion 19A of the support member 19 is abutted against the flange portion 10A of the hydraulic pump 10, and the support member 19 together with the flange portion 10A in this state is fixed to the pump mounting portion 8B of the engine 8, i.e., the vehicle body side, by use of the bolts 11.

A bracket 19C for mounting a below-described pressure sensor 34 is provided on the purifying device supporting portion 19B of the support member 19 in such a manner as to project upward. This bracket 19C is formed in the shape of an elongated plate extending vertically, and its lower portion is secured to a longitudinally intermediate portion of the purifying device supporting portion 19B, while the pressure sensor 34 is mounted on its upper portion. Further, the bracket 19C is for disposing the pressure sensor 34 for constituting a below-described pressure detection unit 31, as well as an upstream side pressure conduit 32 and a downstream side pressure conduit 33 which are connected to that pressure sensor 34, so as to locate them at positions offset from the moving path 30 of a below-described filter cylinder 26.

Namely, the pressure sensor 34 is mounted on an upper end portion of the bracket 19C. In addition, the upstream side pressure conduit 32 and the downstream side pressure conduit 33 are provided along outer peripheral surfaces of an upstream cylinder 21 and a downstream cylinder 24 so as not to serve as obstacles at the time of the mounting and dismounting operation of the filter cylinder 26, and their distal ends are respectively connected to the pressure sensor 34.

Next, a description will be given of the exhaust gas purifying device 20 in accordance with the first embodiment for purifying exhaust gas by removing harmful particulate matter (PM) contained in the exhaust gas emitted from the engine 8.

Figure 3:
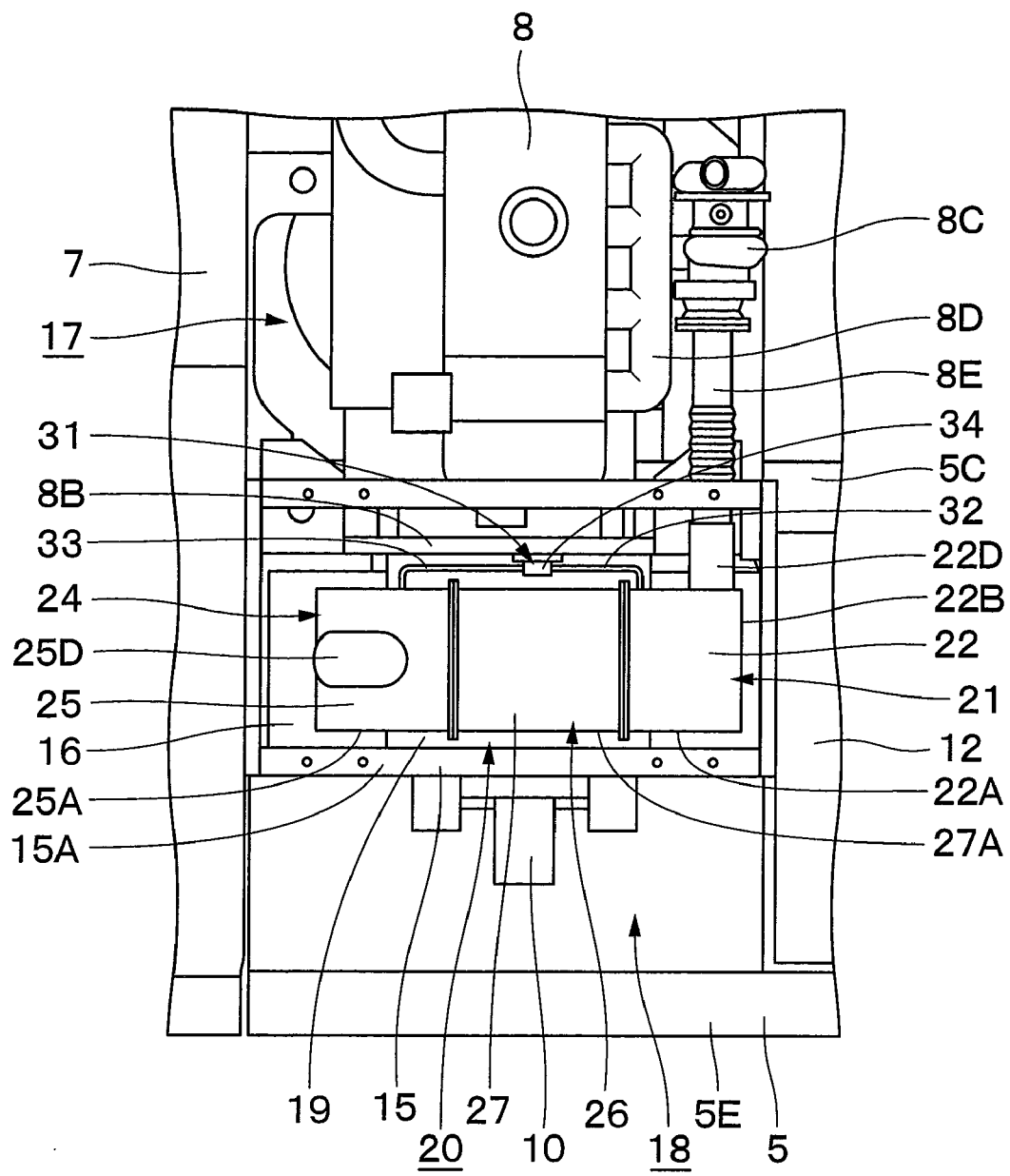
FIG. 3 is an enlarged plan view of essential portions, illustrating in enlarged form an engine, an exhaust gas purifying device, and their vicinities in FIG. 2.

Designated at 20 is the exhaust gas purifying device which is connected to the exhaust pipe 8E, which is a part of the engine 8, by being located on the upper right side of the engine 8. This exhaust gas purifying device 20 removes particulate matter contained in the exhaust gas flowing through the exhaust pipe 8E. As shown in FIGS. 2 to 4, the exhaust gas purifying device 20 is disposed in a laterally mounted state in the engine side space 17 such that its front side in the front and rear directions, for instance, constitutes an upstream side and its rear side constitutes a downstream side. Further, the exhaust gas purifying device is largely constituted by such as the upstream cylinder 21, the downstream cylinder 24, the filter cylinder 26, a particulate matter removing filter 28, and the pressure detection unit 31, which will be described hereinafter.

Figure 13:
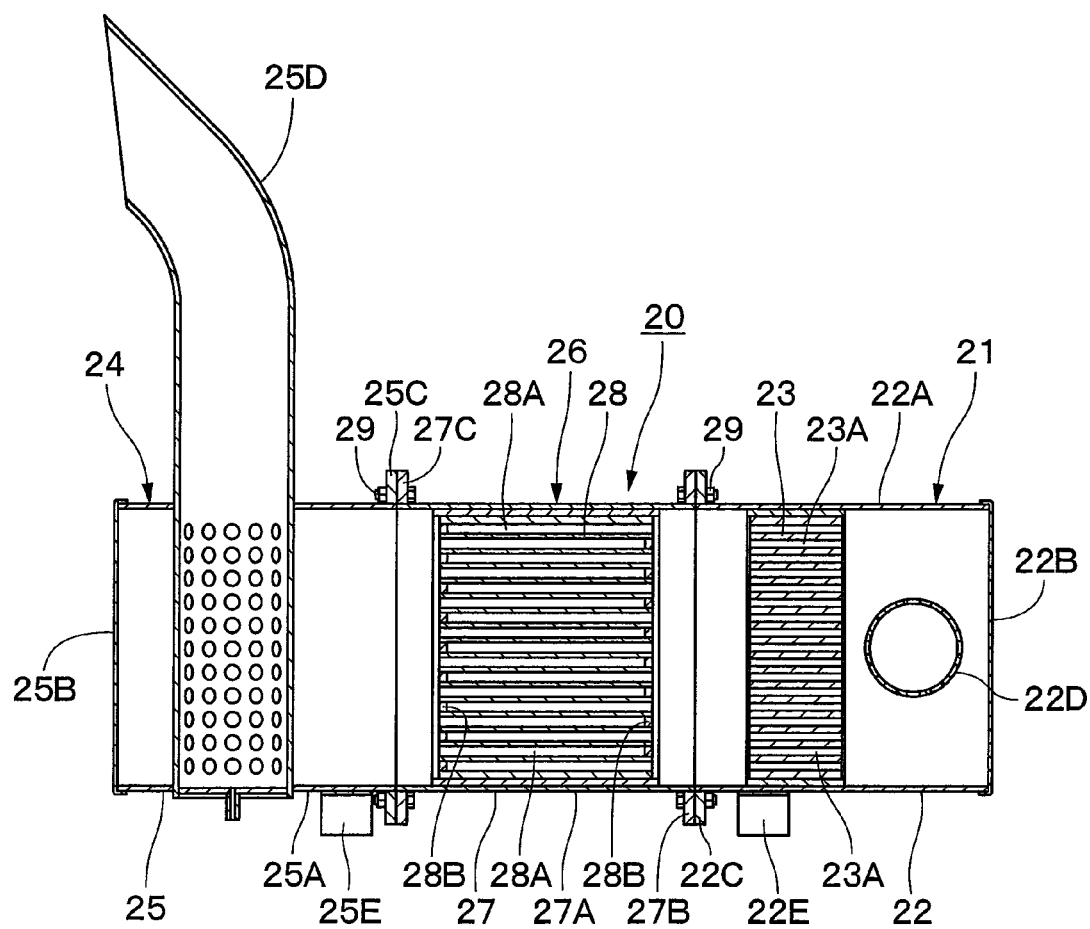
FIG. 13 is a longitudinal sectional view illustrating an internal construction of the exhaust gas purifying device.

As shown in FIG. 7, the exhaust gas purifying device 20 is constructed such that three cylinders, i.e., the upstream cylinder 21, the downstream cylinder 24, and the filter cylinder 26 to be described later, are fastened together by bolts and nuts 29. In addition, as shown in FIG. 13, an oxidation catalyst 23 is accommodated in the upstream cylinder 21, and the particulate matter removing filter 28 is accommodated in the filter cylinder 26.

First, denoted at 21 is the upstream cylinder which is located on the front side (upstream side) of the exhaust gas purifying device 20 and to which the exhaust pipe 8E is connected. This upstream cylinder 21 constitutes an inlet portion into which the exhaust gas flows. Namely, as shown in FIGS. 6 to 8, the upstream cylinder 21 is largely constituted by a cylindrical case 22 and the oxidation catalyst 23 accommodated in that cylindrical case 22.

Indicated at 22 is the cylindrical case constituting an outer shape of the upstream cylinder 21, and the cylindrical case 22 is constituted by a large-diameter cylindrical portion 22A, a lid portion 22B provided so as to close the front side (upstream side) of the cylindrical portion 22A, and a flange portion 22C provided with an enlarged diameter on the rear side (downstream side) of the cylindrical portion 22A. Here, the flange portion 22C is fixed to a front side flange portion 27B of a cylindrical case 27 for making up the filter cylinder 26 by means of the below-described bolts and nuts 29. In consequence, when the flange portion 22C is unfastened by removing the bolts and nuts 29, the filter cylinder 26 is so arranged that it can be removed by being lifted up radially upward.

An inlet pipe 22D having a muffling function is provided on the front side (upstream side) of the cylindrical case 22 in such a manner as to penetrate the cylindrical portion 22A in a diametrical direction. In addition, support legs 22E for fixedly mounting to the purifying device supporting portion 19B of the support member 19 are provided on the lower side of the cylindrical portion 22A.

Figure 12:
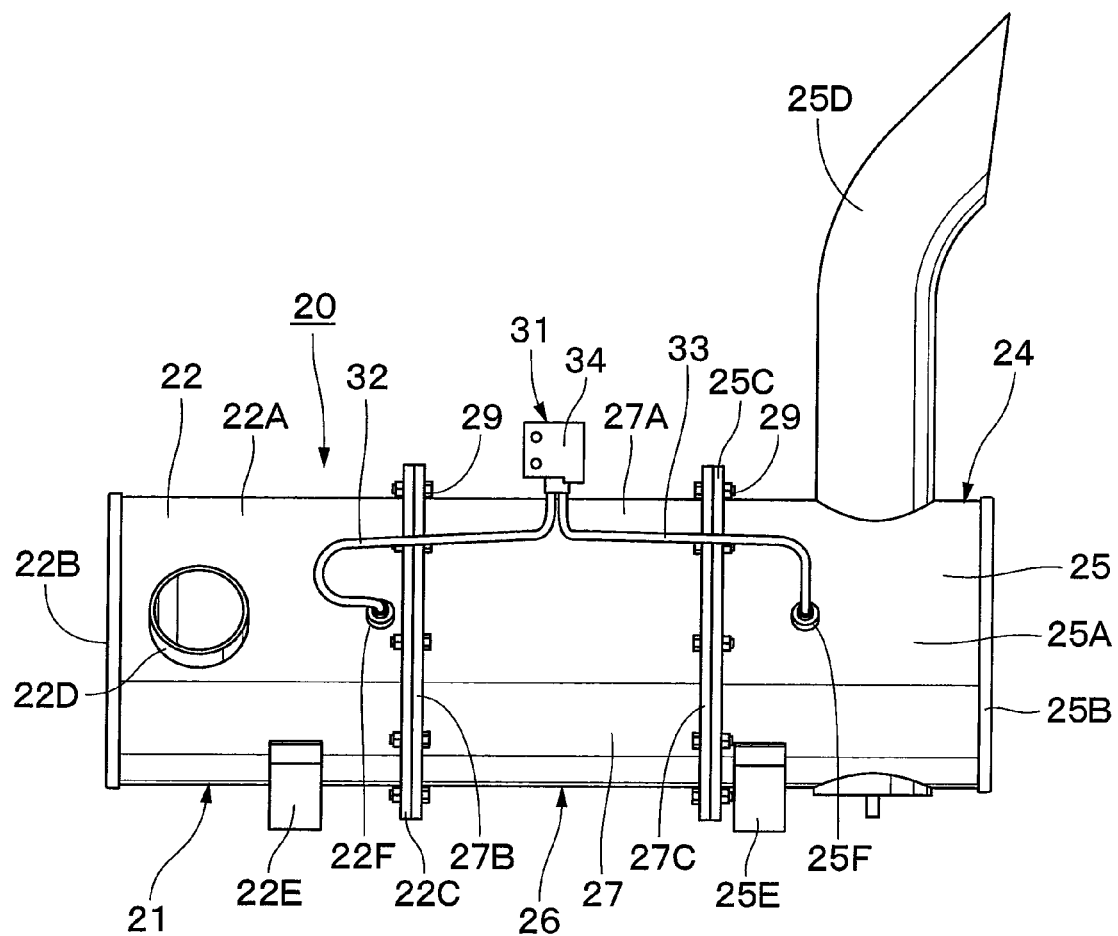
FIG. 12 is an external view of the exhaust gas purifying device, taken from the engine side.

As shown in FIG. 12, an upstream side pressure pick out portion 22F is provided on the cylindrical case 22 by being located on the left side of the cylindrical portion 22A. The pressure pick out portion 22F is for picking out the upstream side pressure of the particulate matter removing filter 28 in the pressure of the exhaust gas flowing in the exhaust gas purifying device 20, and is connected to the below-described pressure sensor 34 through the upstream side pressure conduit 32.

Indicated at 23 is the oxidation catalyst which is provided by being located on the downstream side within the cylindrical case 22. The oxidation catalyst 23 oxidizes and removes harmful substances such as nitrogen monoxide (NO), carbon monoxide (CO), and hydrocarbons (HC) contained in the exhaust gas. The oxidation catalyst 23 is formed of a cellular cylindrical body made of, for example, a ceramic, a multiplicity of through holes 23A are formed in its axial direction, and their inner surfaces are coated with a precious metal or the like.

Next, denoted at 24 is the downstream cylinder which is provided at a rear position downstream of the upstream cylinder 21 with the below-described filter cylinder 26 sandwiched therebetween. This downstream cylinder 24 constitutes an outlet portion for the flowing out of the exhaust gas. Namely, as shown in FIG. 13, the downstream cylinder 24 is constituted by a cylindrical case 25.

Indicated at 25 is the cylindrical case constituting the downstream cylinder 24. In substantially the same way as the cylindrical case 22 of the upstream cylinder 21, the cylindrical case 25 is constituted by a large-diameter cylindrical portion 25A, a lid portion 25B provided so as to close the rear side (downstream side) of the cylindrical portion 25A, and a flange portion 25C provided with an enlarged diameter on the front side (upstream side) of the cylindrical portion 25A. The flange portion 25C is fixed to a rear side flange portion 27C of the cylindrical case 27 for constituting the filter cylinder 26 by means of the bolts and nuts 29.

An outlet pipe 25D having a muffling function is provided on the rear side (downstream side) of the cylindrical case 25 in such a manner as to penetrate the cylindrical portion 25A in a diametrical direction (vertical direction), and its upper portion is formed as a tail pipe. In addition, support legs 25E for fixedly mounting to the purifying device supporting portion 19B of the support member 19 are provided on the lower side of the cylindrical portion 25A.

Further, a downstream side pressure pick out portion 25F is provided on the cylindrical case 25 by being located on the left side of the cylindrical portion 25A. The pressure pick out portion 25F is for picking out the downstream side pressure of the particulate matter removing filter 28 in the pressure of the exhaust gas flowing through the exhaust gas passage, and is connected to the below-described pressure sensor 34 through the downstream side pressure conduit 33.

Here, the upstream cylinder 21 can be fixedly mounted on the purifying device supporting portion 19B of the support member 19 by the support legs 22E, while the downstream cylinder 24 can be fixedly mounted on the purifying device supporting portion 19B of the support member 19 by the support legs 25E. In this state, as shown in FIG. 8, an insertion space S for mounting the below-described filter cylinder 26 can be formed between the upstream cylinder 21 and the downstream cylinder 24. In consequence, in the state in which the insertion space S for the filter cylinder 26 is secured with respect to the support member 19, the upstream cylinder 21 and the downstream cylinder 24 are fixedly mounted to the support member 19, thereby making it possible to construct the exhaust gas purifying device as a subassembly.

Indicated at 26 is the filter cylinder for removing the particulate matter, which is provided between the upstream cylinder 21 and the downstream cylinder 24. This filter cylinder 26 forms a main body portion of the exhaust gas purifying device 20, and is largely constituted by the cylindrical case 27 and the particulate matter removing filter 28 which will be described hereinafter.

Indicated at 27 is the cylindrical case constituting the outer shape of the filter cylinder 26. The cylindrical case 27 is constituted by a cylindrical portion 27A, the front side flange portion 27B provided with an enlarged diameter on the front side (upstream side) of the cylindrical portion 27A, and the rear side flange portion 27C provided with an enlarged diameter on the rear side (downstream side) of the cylindrical portion 27A.

As shown in FIG. 8, the cylindrical case 27 can be removed from the support member 19 and lifted up as a single unit by merely loosening and removing the bolts and nuts 29, and the cylindrical case 27 can be moved to another work site for performing a maintenance operation. Meanwhile, the cylindrical case 27 upon completion of the maintenance operation can be connected and assembled in the insertion space S between the upstream cylinder 21 and the downstream cylinder 24. In this case, as the maintenance operation, it is possible to cite such as a cleaning operation for removing ash deposited in the particulate matter removing filter 28, an inspection operation for confirming the presence or absence of damage and the like, and a repair operation for effecting the repair of the damaged portion and replacement of parts.

Indicated at 28 is the particulate matter removing filter (generally called a diesel particulate filter, abbreviated as DPF) which is accommodated in the cylindrical case 27. The particulate matter removing filter 28 purifies the exhaust gas by trapping the particulate matter (PM) in the exhaust gas emitted from the engine 8.

Further, the particulate matter removing filter 28 is formed as a cellular cylindrical body in which a porous member constituted of, for example, a ceramic material is provided with a multiplicity of small diameter passages 28A in the axial direction, and contiguously alternate and different ends of the small diameter passages 28A are respectively closed by sealing members 28B. In consequence, as for the particulate matter removing filter 28, as the exhaust gas flowing into the small diameter passages 28A from one side is passed through the porous material, the particulate matter is trapped, and the purified exhaust gas is caused to flow from the adjacent small diameter passages 28A to the other side.

On the other hand, when the upstream side pressure and the downstream side pressure are detected by the below-described pressure detection unit 31, and its pressure difference has reached a predetermined value, i.e., when a large amount of particulate matter has been deposited in the small diameter passages 28A, the particulate matter removing filter 28 removes the particulate matter by burning it. However, even if the particulate matter is burned, part of it is reduced to ash and is gradually deposited in the small diameter passages 28A. In addition, other unburned residues, e.g., heavy metals, calcium, and the like in the engine oil, are also gradually deposited. Accordingly, the particulate matter removing filter 28 is so adapted that the filter cylinder 26 is dismounted to remove the deposits.

Indicated at 29 are the multiplicity of bolts and nuts which are provided between the upstream cylinder 21 and the filter cylinder 26 and between the downstream cylinder 24 and the filter cylinder 26, respectively. These bolts and nuts 29 are capable of fastening the flange portion 22C of the upstream cylinder 21 and the front side flange portion 27B of the filter cylinder 26 as well as the flange portion 25C of the downstream cylinder 24 and the rear side flange portion 27C of the filter cylinder 26 in such a manner as to be capable of dismantling them.

Next, denoted at 30 is the moving path in cases where the filter cylinder 26 is dismounted from the upstream cylinder 21 and the downstream cylinder 24 and is moved to another location, or is returned from the other location and is remounted. This moving path 30 is formed in a vertical space between the engine 8 and the vertical plate portion 16B of the partition member 16 in the engine side space 17, e.g., in the range of a fan-shaped angle $\alpha$ having a spread in the left and right directions above the filter cylinder 26 (a space sandwiched by two-dots chain lines in FIG. 6).

It should be noted that, in this embodiment, since the exhaust gas purifying device 20 is peripherally surrounded by the frame portion 15A and the leg portions 15B of the mounting frame 15 for mounting the partition member 16, the moving path 30 is provided between the vertical plate portion 16B of the partition member 16 and the engine 8 in a range surrounded by the frame portion 15A in the engine side space 17.

Here, the moving path 30 can be used as a passage for moving the filter cylinder 26 when the filter cylinder 26 is mounted and dismounted to effect the maintenance operation of the particulate matter removing filter 28. In consequence, the filter cylinder 26 can be dismounted from between the upstream cylinder 21 and the downstream cylinder 24 as a single unit, and the filter cylinder 26 in the dismounted state can be moved to another workplace. After the working operation, the filter cylinder 26 can be returned from the other location to between the upstream cylinder 21 and the downstream cylinder 24.

The exhaust gas purifying device 20 is provided in the vicinity of the engine 8 so as to be able to treat the particulate matter in the exhaust gas in a high temperature state. For this reason, numerous equipment and parts including the engine 8, the hydraulic pump 10, the mounting frame 15, the partition member 16, the hydraulic piping (not shown), and the like are installed in the surroundings of the exhaust gas purifying device 20. Accordingly, the upstream cylinder 21 is disposed on the front side of the filter cylinder 26, the downstream cylinder 24 is disposed on the rear side thereof, the engine 8 is disposed on the left side thereof, the vertical plate portion 16B of the partition member 16 is disposed on the right side thereof, and the purifying device supporting portion 19B of the support member 19 is disposed on the lower side thereof. Further, the exhaust gas purifying device 20 is disposed in a range surrounded by the frame portion 15A of the mounting frame 15.

In consequence, the place in the vicinity of the engine 8 where the exhaust gas purifying device 20 is disposed is formed such as a narrow space where only the upper side is open. However, as the pressure conduits 32 and 33 and the pressure sensor 34 of the below-described pressure detection unit 31 are disposed at positions offset from the moving path 30, the filter cylinder 26 can be easily mounted or dismounted even in the narrow space.

Designated at 31 is the pressure detection unit for detecting the deposited state (clogged state) of the particulate matter in the particulate matter removing filter 28. This pressure detection unit 31 is constituted by the upstream side pressure conduit 32, the downstream side pressure conduit 33, and the pressure sensor 34.

Indicated at 32 is the upstream side pressure conduit provided between the upstream cylinder 21 and the below-described pressure sensor 34. The upstream side pressure conduit 32 leads the pressure within the cylindrical case 22 on the upstream side of the particulate matter removing filter 28 to the pressure sensor 34. Further, the upstream side pressure conduit 32 is disposed along the outer peripheries of the upstream cylinder 21 and the filter cylinder 26, and one end thereof is connected to the pressure pick out portion 22F of the cylindrical case 22, while the other end thereof is connected to the pressure sensor 34.

Indicated at 33 is the downstream side pressure conduit provided between the downstream cylinder 24 and the pressure sensor 34. The downstream side pressure conduit 33 leads the pressure within the cylindrical case 25 on the downstream side of the particulate matter removing filter 28 to the pressure sensor 34. Further, the downstream side pressure conduit 33 is disposed along the outer peripheries of the downstream cylinder 24 and the filter cylinder 26, and one end thereof is connected to the pressure pick out portion 25F of the cylindrical case 25, while the other end thereof is connected to the pressure sensor 34.

Indicated at 34 is the pressure sensor provided at a distal end of the bracket 19C of the support member 19. The pressure sensor 34 detects the front and rear pressures of the particulate matter removing filter 28. Namely, the pressure sensor 34 is constituted by, for example, a piezoelectric element or the like, and detects the pressure (differential pressure) between the upstream side and downstream side of the particulate matter removing filter 28 to measure the deposited amount of such as the particulate matter and unburned residues in the particulate matter removing filter 28. Further, the pressure sensor 34 is connected to the pressure pick out portion 22F of the cylindrical case 22 of the upstream cylinder 21 through the upstream side pressure conduit 32 and to the pressure pick out portion 25F of the cylindrical case 25 of the downstream cylinder 24 through the downstream side pressure conduit 33.

Here, since the pressure sensor 34 is mounted on the bracket 19C of the support member 19 leftwardly spaced apart from the filter cylinder 26, the pressure sensor 34, together with the upstream side pressure conduit 32 and the downstream side pressure conduit 33, can be disposed at a position offset from the moving path 30 of the filter cylinder 26. Accordingly, the pressure sensor 34 can be disposed in an unobstructing position when the filter cylinder 26 is mounted or dismounted vertically with respect to the upstream cylinder 21 and the downstream cylinder 24.

The exhaust gas purifying device 20 in accordance with the first embodiment has the above-described construction, and a description will next be given of its assembling operation.

First, the flange portion 22C for forming the cylindrical case 22 of the upstream cylinder 21 and the front side flange portion 27B for forming the cylindrical case 27 of the filter cylinder 26 are opposed to each other, and the two portions in this state are fastened by using the bolts and nuts 29.

Similarly, the flange portion 25C for forming the cylindrical case 25 of the downstream cylinder 24 and the rear side flange portion 27C for forming the cylindrical case 27 of the filter cylinder 26 are opposed to each other, and the two portions in this state are fastened by using the bolts and nuts 29.

In consequence, the upstream cylinder 21, the downstream cylinder 24, and the filter cylinder 26 can be assembled in series so as to be positioned substantially coaxially. On the other hand, these cylinders can be disassembled from each other when they are dismounted by loosening the bolts and nuts 29.

Next, one end of the upstream side pressure conduit 32 is connected to the pressure pick out portion 22F of the cylindrical case 22, and the other end thereof is connected to the pressure sensor 34. Similarly, one end of the downstream side pressure conduit 33 is connected to the pressure pick out portion 25F of the cylindrical case 25, and the other end thereof is connected to the pressure sensor 34.

Further, after the upstream cylinder 21, the downstream cylinder 24, and the filter cylinder 26 are joined, and the pressure sensor 34 and the like are connected, this exhaust gas purifying device 20 is placed on the purifying device supporting portion 19B of the support member 19. In this state, the support legs 22E of the upstream cylinder 21 are fixed to the purifying device supporting portion 19B by using bolts and nuts 35, and the support legs 25E of the downstream cylinder 24 are fixed to the purifying device supporting portion 19B by using bolts and nuts 35. In addition, the pressure sensor 34 is mounted to an upper portion of the bracket 19C of the support member 19. In consequence, the exhaust gas purifying device 20 can be mounted on the support member 19 (engine 8 side), thereby making it possible to constitute a purifying device subassembly.

With the above-described arrangements, the hydraulic excavator 1 of the first embodiment is put in operation in the manner as follows.

First, the operator climbs into the cab 6 of the upper revolving structure 3 and starts the engine 8 to drive the hydraulic pump 10. In consequence, the pressurized oil from the hydraulic pump 10 is supplied to various actuators through a control valve. When the operator who is seated in the cab 6 manipulates the operation lever for traveling, the lower traveling structure 2 can be moved forward or rearward. In addition, as the operator manipulates the operation lever for work operation, it is possible to perform such as the operation of excavating earth and sand by lowering and raising the working mechanism 4.

Further, during the operation of the engine 8, harmful particulate matter is emitted from its exhaust pipe 8E. At this time, the exhaust gas purifying device 20 is capable of discharging the purified exhaust gas to the outside by trapping the particulate matter by means of the particulate matter removing filter 28. Meanwhile, when the particulate matter trapped by the particulate matter removing filter 28 is accumulated by a predetermined amount, the particulate matter is removed (regenerated) by burning it. Further, in the case where the particulate matter is burned, ash after burning is gradually deposited in the particulate matter removing filter 28. For this reason, a cleaning operation for removing the ash deposited in the particulate matter removing filter 28 becomes necessary.

Accordingly, a description will be given of the case of performing the cleaning operation for removing the ash of the particulate matter deposited in the particulate matter removing filter 28 of the filter cylinder 26.

In the cleaning operation of the particulate matter removing filter 28, it is necessary to dismount the filter cylinder 26, so that the bolts and nuts 29 fastening the upstream cylinder 21 and the filter cylinder 26 are removed, and the bolts and nuts 29 fastening the downstream cylinder 24 and the filter cylinder 26 are removed. At this time, the filter cylinder 26 is arranged to be fitted to the upstream cylinder 21 and the downstream cylinder 24 by flat flange connection which is free of spigot-like fitting. As a result, the filter cylinder 26 can be easily dismounted from between the upstream cylinder 21 and the downstream cylinder 24 by being merely pulled upward, and the filter cylinder 26 can be taken out to outside the housing cover 14 through the moving path 30.

Meanwhile, the upstream side pressure conduit 32, the downstream side pressure conduit 33, and the pressure sensor 34 are disposed at left side positions offset from the moving path 30 which is a passage at the time of pulling the filter cylinder 26 upward. Thus, although the moving path 30 is provided as a space in which only the upper side is open and which has the narrow, limited fan-shaped angle α, the filter cylinder 26 can be easily moved to a location for performing the cleaning operation, without being obstructed by the upstream side pressure conduit 32, the downstream side pressure conduit 33, and the pressure sensor 34.

After the filter cylinder 26 is moved to another workplace, the deposited ash of the particulate matter can be removed by such as blowing compressed air or the like toward the particulate matter removing filter 28 within the filter cylinder 26.

Further, after completion of the cleaning operation, it suffices if the filter cylinder 26 is inserted into the insertion space S through the moving path 30, and is fastened to the upstream cylinder 21 and the downstream cylinder 24 by use of the bolts and nuts 29.

As such, according to the first embodiment, the upstream cylinder 21 and the downstream cylinder 24 are fixedly provided with respect to the engine 8 side, and the filter cylinder 26 is provided mountably and dismountably with respect to the upstream cylinder 21 and the downstream cylinder 24. Accordingly, only the filter cylinder 26 can be dismounted in a state in which the upstream cylinder 21 and the downstream cylinder 24 left on the engine 8 side.

As a result, since only the filter cylinder 26 can be moved to another workplace, the maintenance operation of the particulate matter removing filter 28, including such as the cleaning operation, inspection operation, and repair operation thereof, can be easily performed, making it possible to improve workability.

Moreover, the upstream side pressure conduit 32, the downstream side pressure conduit 33, and the pressure sensor 34 which are provided to detect the deposited state of the particulate matter in the particulate matter removing filter 28 are arranged to be disposed at positions offset from the moving path 30 which is used when the filter cylinder 26 is dismounted from the upstream cylinder 21 and the downstream cylinder 24 and is moved to another location or is returned from the other location.

Accordingly, as the moving path 30 is provided, even in cases where the filter cylinder 26, around which there are numerous obstacles and which is disposed in a narrow space, is dismounted or remounted for the purpose of maintenance operation, the upstream side pressure conduit 32, the downstream side pressure conduit 33, and the pressure sensor 34 do not serve as obstacles, and there is no need to dismount these parts.

As a result, since only the filter cylinder 26 can be easily mounted or dismounted in a state in which the upstream cylinder 21, the downstream cylinder 24, the pressure sensor 34, and the like installed as they are on the engine 8 side, it is possible to easily perform the maintenance operation of the particulate matter removing filter 28 incorporated in the filter cylinder 26.

Further, since the pressure sensor 34 is mounted on the upper portion of the bracket 19C provided on the support member 19, it is possible to easily make visual inspection of such as the state of the pressure sensor 34 and the states of connection of the pressure conduits 32 and 33 to the pressure sensor 34. In addition, since these parts are easily accessible, they can be repaired easily. As a consequence, it is possible to improve workability in such as the assembling operation and the maintenance operation.

Meanwhile, since the partition member 16 for partitioning between the engine side space 17 and the pump side space 18, it is possible to prevent, for example, the hydraulic oil which leaked from scattering to the high-temperature engine 8 side, thereby making it possible to improve safety, reliability, and the like.

Thus, even in the case where the space has become narrower owing to the provision of the mounting frame 15 and the partition member 16, the moving path 30 for moving the filter cylinder 26 can be formed between the vertical plate portion 16B of the partition member 16 and the engine 8. In consequence, the filter cylinder 26 can be moved to a workplace for performing the maintenance operation or can also be returned from the workplace to between the cylinders 21 and 24 through the moving path 30.

In addition, since the upstream cylinder 21, the downstream cylinder 24, and the pressure sensor 34 are mounted on the support member 19 provided on the engine 8, this pressure sensor 34 can be disposed on the same vibration system as that of the cylinders 21 and 24. As a consequence, it is possible to prevent causing damage to the pressure conduits 32 and 33 connecting the pressure sensor 34 and the cylinders 21 and 24, thereby making it possible to prolong the service life of the pressure detection unit 31.

Further, the upstream side pressure conduit 32 and the downstream side pressure conduit 33 are disposed at positions offset from the moving path 30 of the filter cylinder 26 along the outer peripheries of the upstream cylinder 21, the downstream cylinder 24, and the filter cylinder 26. In consequence, the filter cylinder 26 can be moved without the upstream side pressure conduit 32 and the downstream side pressure conduit 33 serving as obstacles. Accordingly, the overall exhaust gas purifying device 20 including the pressure sensor 34 can be formed compactly and can be installed in a narrow space.

Figure 14:
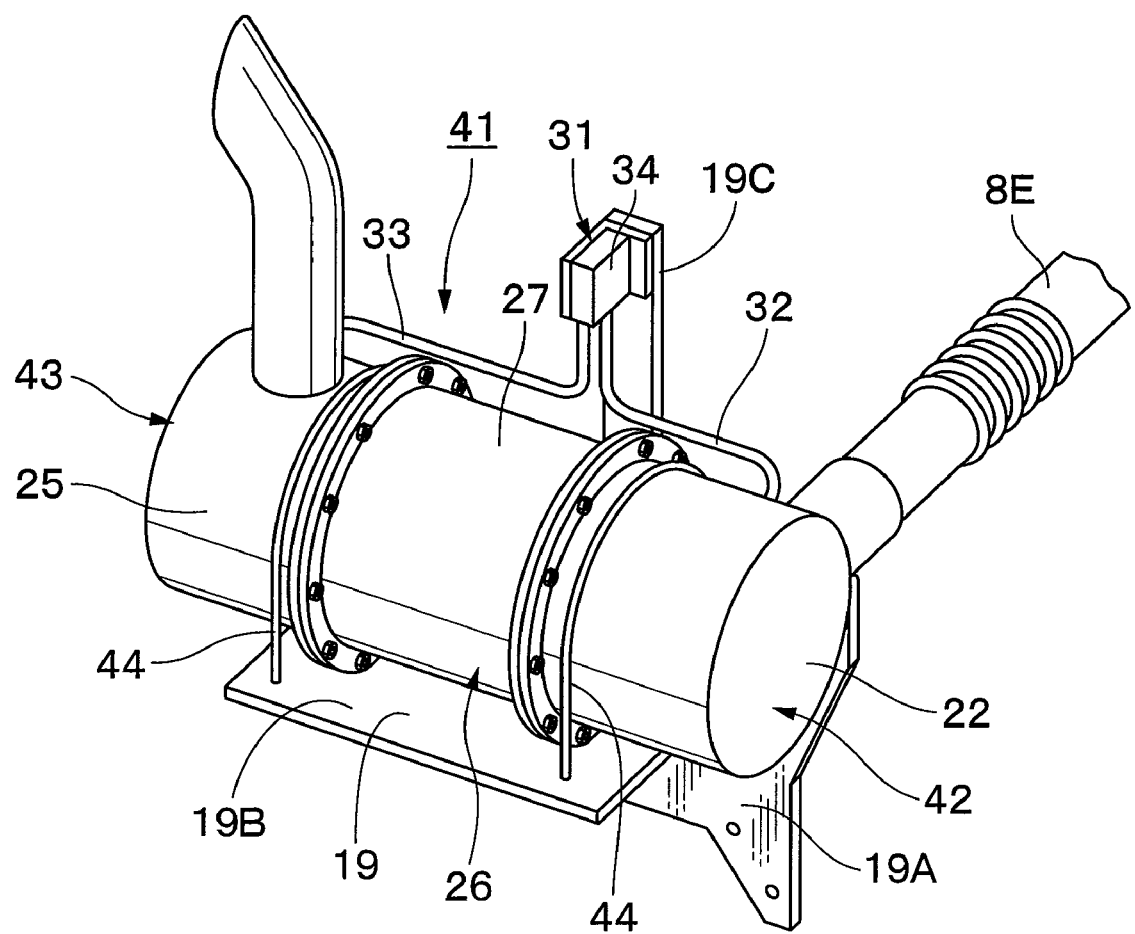
FIG. 14 is an enlarged perspective view of the exhaust gas purifying device in accordance with a second embodiment in a state in which the exhaust gas purifying device is mounted on the support member.

Next, FIG. 14 shows an exhaust gas purifying device in accordance with a second embodiment of the invention. The characteristic feature of this embodiment lies in the construction in which the upstream cylinder and the downstream cylinder are respectively fixedly mounted on the support member on the engine side by using U-bolts. It should be noted that, in the second embodiment, the component elements that are identical to those of the foregoing first embodiment will be simply indicated by the same reference numerals to avoid repetitions of similar explanations.

In FIG. 14, designated at 41 is an exhaust gas purifying device in accordance with the second embodiment. Next, indicated at 42 is an upstream cylinder of the exhaust gas purifying device 41, and the upstream cylinder 42 differs from the upstream cylinder 21 in accordance with the first embodiment in that the support legs are not provided. Further, indicated at 43 is a downstream cylinder of the exhaust gas purifying device 41, and in substantially the same way as the upstream cylinder 42 the downstream cylinder 43 differs from the downstream cylinder 24 in accordance with the first embodiment in that the support legs are not provided.

Denoted at 44 are U-bolts which are provided for the upstream cylinder 42 and the downstream cylinder 43, respectively, so as to surround them. The U-bolts 44 are for fixedly mounting the exhaust gas purifying device 41 to the support member 19. Further, the U-bolts 44 are provided so as to surround the upstream cylinder 42 and the downstream cylinder 43 from the upper side, and are capable of fixedly mounting the upstream cylinder 42 and the downstream cylinder 43 to the support member 19 as both leading end sides with male screws provided thereon are passed through the purifying device supporting portion 19B of the support member 19, and nuts (not shown) are threadedly secured to their projecting portions.

As such, also with the second embodiment thus constructed, it is possible to obtain operational effects substantially similar to those of the above-described first embodiment. Particularly, in the second embodiment, the upstream cylinder 42 and the downstream cylinder 43 of the exhaust gas purifying device 41 can be mounted to the support member 19 at low cost by use of the commercially available U-bolts 44 and the like.

Figure 15:
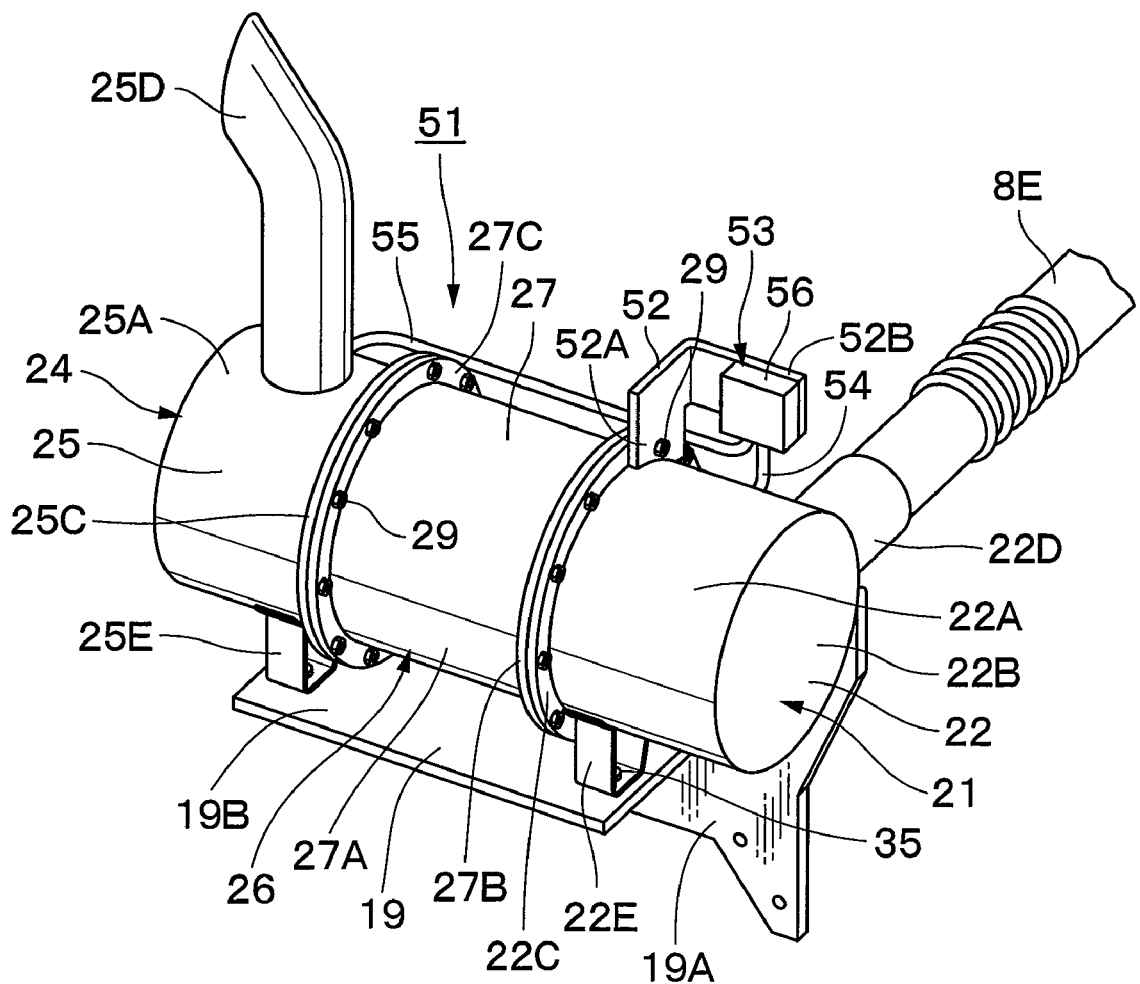
FIG. 15 is an enlarged perspective view of the exhaust gas purifying device in accordance with a third embodiment in a state in which the exhaust gas purifying device is mounted on the support member.
Figure 16:
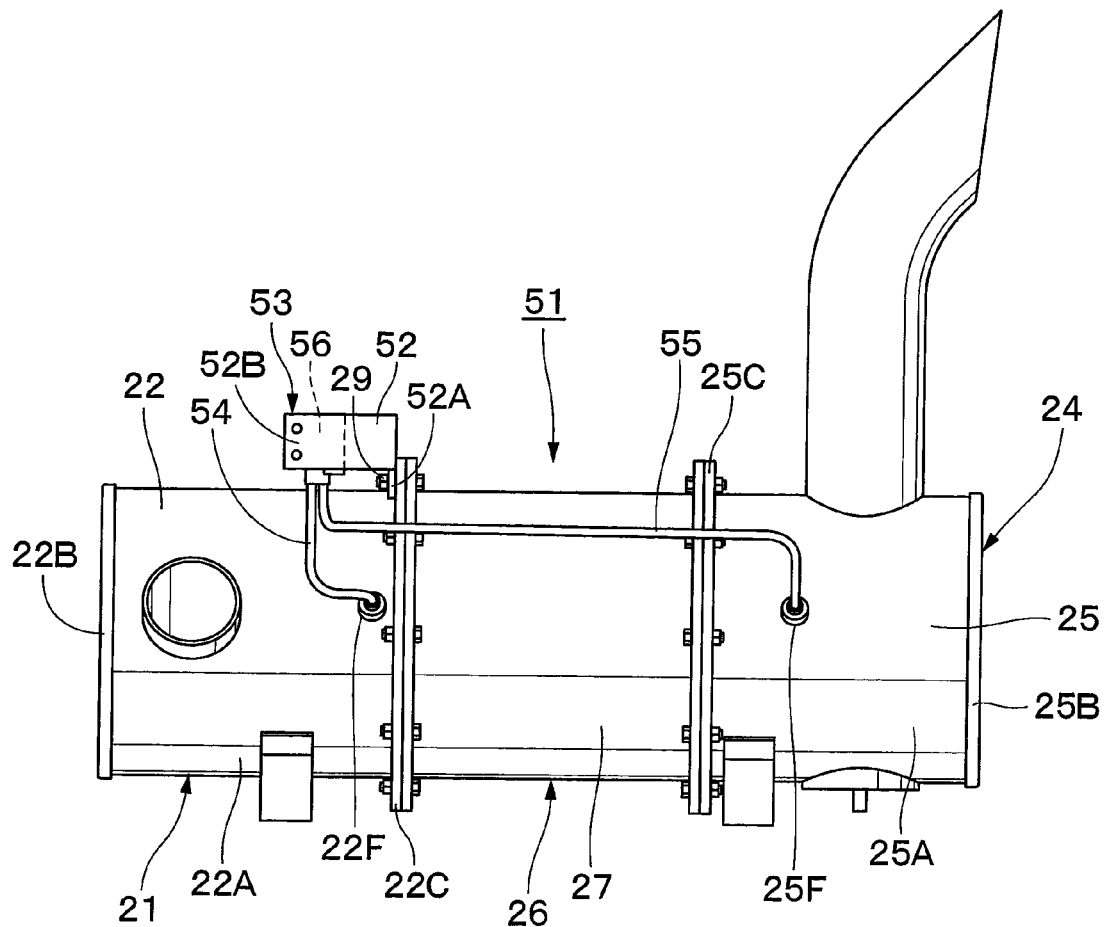
FIG. 16 is an external view, taken from the engine side, of the exhaust gas purifying device in FIG. 15.

Next, FIGS. 15 and 16 show an exhaust gas purifying device in accordance with a third embodiment of the invention. The characteristic feature of this embodiment lies in the construction in which the pressure sensor is mounted on the upstream cylinder at a position offset from the moving path of the filter cylinder. It should be noted that, in the third embodiment, the component elements that are identical to those of the foregoing first embodiment will be simply indicated by the same reference numerals to avoid repetitions of similar explanations.

In FIGS. 15 and 16, designated at 51 is an exhaust gas purifying device in accordance with the third embodiment. Next, denoted at 52 is a bracket which is provided on the outer peripheral side of the upstream cylinder 21 to mount a below-described pressure sensor 56. This bracket 52 has a simple shape obtained by, for instance, merely bending a plate substantially into an L-shape, and is fastened to the flange portion 22C of the cylindrical case 22 by use of the bolts and nuts 29.

Here, the bracket 52 is formed by, for instance, bending a rectangular plate into an L-shape. The bracket 52 has one end portion extending downward to form a fixing portion 52A and the other end portion extending toward the upstream cylinder 21 side to form a sensor mounting portion 52B. Further, the fixing portion 52A is fastened to the flange portion 22C of the cylindrical case 22 by use of the bolts and nuts 29. Thus, since the bracket 52 is provided on the outer peripheral side of the upstream cylinder 21, the pressure sensor 56 can be disposed at a position offset from the moving path 30 of the filter cylinder 26 toward the front side by mounting the pressure sensor 56 to the sensor mounting portion 52B of this bracket 52.

Designated at 53 is a pressure detection unit in accordance with the third embodiment. This pressure detection unit 53 is constituted by an upstream side pressure conduit 54, a downstream side pressure conduit 55, and the pressure sensor 56.

Indicated at 54 is the upstream side pressure conduit of the pressure detection unit 53, and the upstream side pressure conduit 54 is disposed along the outer periphery of the upstream cylinder 21, and one end thereof is connected to the pressure pick out portion 22F of the cylindrical case 22 of the upstream cylinder 21, while the other end thereof is connected to the below-described pressure sensor 56. In addition, denoted at 55 is the downstream side pressure conduit of the exhaust gas purifying device 51, and the exhaust gas purifying device 55 is disposed along the outer peripheries of the downstream cylinder 24 and the filter cylinder 26, and one end thereof is connected to the pressure pick out portion 25F of the cylindrical case 25 of the downstream cylinder 24, while the other end thereof is connected to the pressure sensor 56.

Indicated at 56 is the pressure sensor provided on the bracket 52. In substantially the same way as the pressure sensor 34 in accordance with the above-described first embodiment, the pressure sensor 56 detects the front and rear pressures of the particulate matter removing filter 28. Further, the pressure sensor 56 is connected to the interior of the cylindrical case 22 of the upstream cylinder 21 through the upstream side pressure conduit 54 and to the interior of the cylindrical case 25 of the downstream cylinder 24 through the downstream side pressure conduit 55.

Here, the pressure sensor 56 is mounted on the sensor mounting portion 52B of the bracket 52 provided on the outer peripheral side of the upstream cylinder 21. Therefore, the pressure sensor 56, together with the upstream side pressure conduit 54 and the downstream side pressure conduit 55, can be disposed at a position offset from the moving path 30 of the filter cylinder 26. In consequence, the pressure sensor 56 can be disposed in an unobstructing position when the filter cylinder 26 is mounted or dismounted vertically with respect to the upstream cylinder 21 and the downstream cylinder 24.

Thus, also with the third embodiment thus constructed, it is possible to obtain operational effects substantially similar to those of the above-described first embodiment. Particularly, in the third embodiment, the pressure sensor 56 can be mounted on the bracket 52 having a simple shape by making use of the upstream cylinder 21, thereby making it possible to simplify the construction.

It should be noted that, in the third embodiment, a description has been given by citing as an example the case in which the configuration provided is such that the pressure sensor 56 and the like are disposed by being offset from the moving path 30 of the filter cylinder 26 by providing the bracket 52 on the outer peripheral side of the upstream cylinder 21 and by mounting the pressure sensor 56 on this bracket 52. However, the present invention is not limited to this particular example, and a configuration may be provided as in an exhaust gas purifying device 61 in accordance with a first modification shown in FIG. 17.

Figure 17:
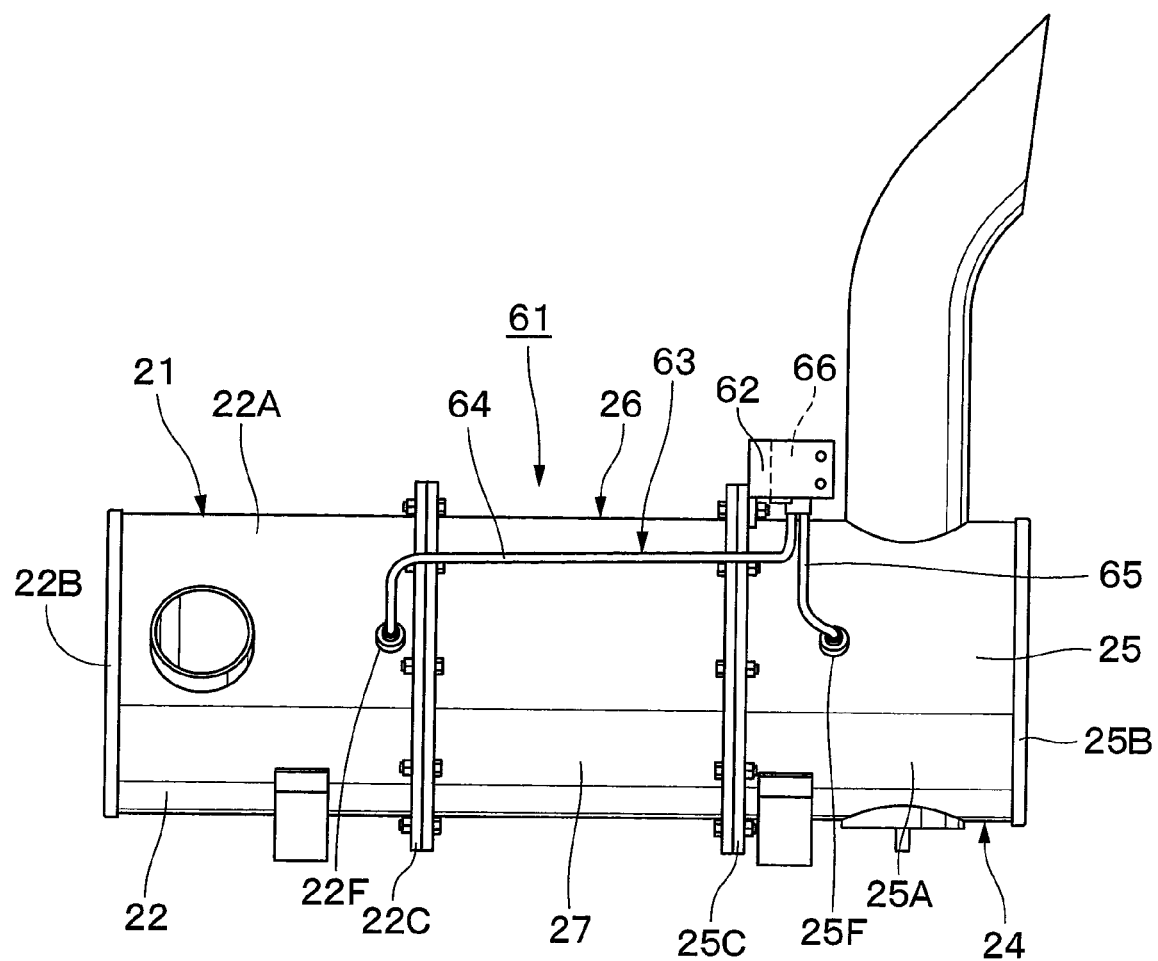
FIG. 17 is an external view, taken from the engine side, of the exhaust gas purifying device in accordance with a first modification.

Namely, it is possible to provide a configuration in which, in FIG. 17, a bracket 62 is provided on the outer peripheral side of the downstream cylinder 24, and a pressure sensor 66 with pressure conduits 64 and 65 of a pressure detection unit 63 connected to this bracket 62. In this case as well, the pressure sensor 66 can be disposed by being offset from the moving path 30 of the filter cylinder 26 toward the rear side.

Further, in the first embodiment, the flange portions 22C, 25C, 27B, and 27C are respectively provided on the cylindrical cases 22, 25, and 27 of the upstream cylinder 21, the downstream cylinder 24, and the filter cylinder 26. The flange portions 22C and 27B as well as the flange portions 25C and 27C which oppose each other are arranged to be fastened to each other so as to be capable of being disassembled by the bolts and nuts 29. However, the present invention is not limited to this particular example, and a configuration may be provided as in an exhaust gas purifying device 71 in accordance with a second modification shown in FIG. 18.

Figure 18:
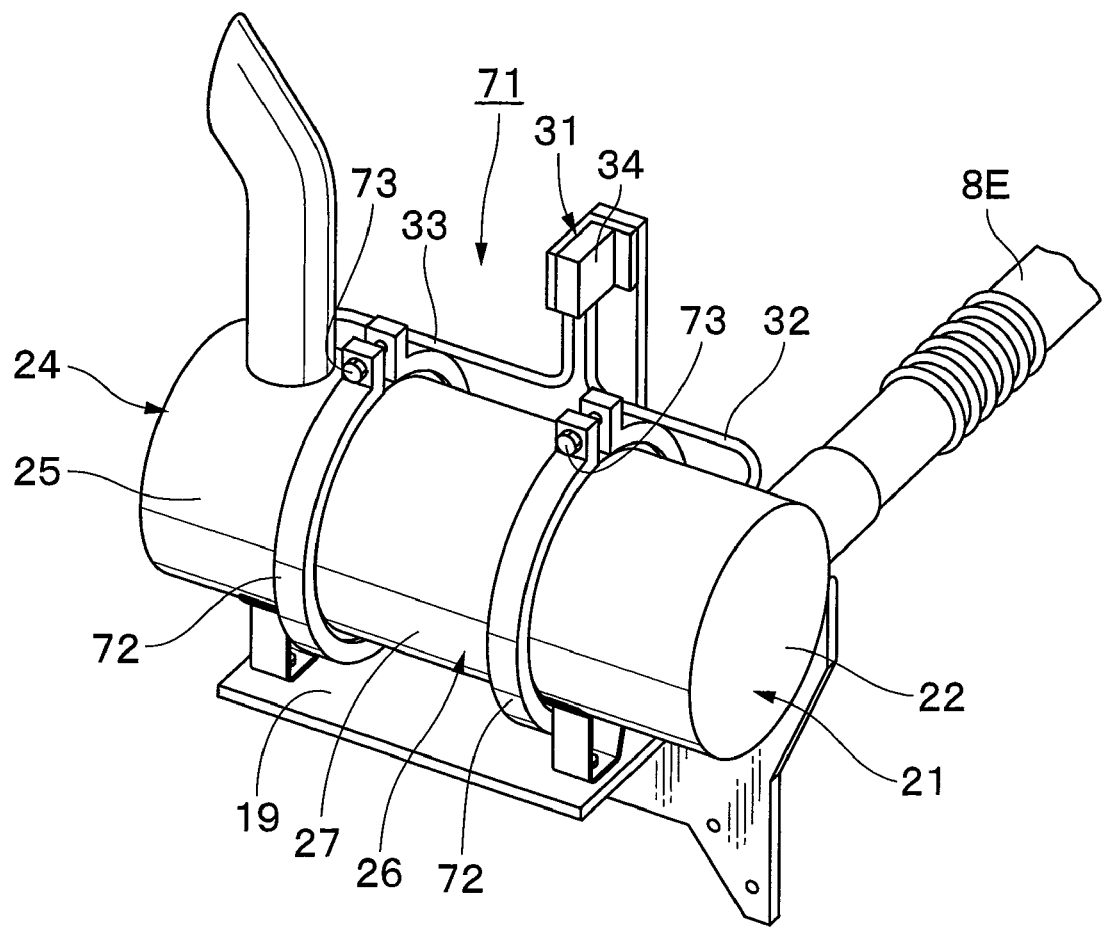
FIG. 18 is an enlarged perspective view of the exhaust gas purifying device in accordance with a second modification in a state in which the exhaust gas purifying device is mounted on the support member.

Namely, it is possible to provide a configuration in which, in FIG. 18, a pair of clamps 72 with a V-shaped cross section are provided which respectively surround the opposing flange portions 22C and 27B and flange portions 25C and 27C of the upstream cylinder 21, the downstream cylinder 24, and the filter cylinder 26, and these V-shaped clamps 72 are each tightened circumferentially by use of a bolt 73 so as to respectively fasten the opposing flange portions 22C and 27B and flange portions 25C and 27C. This construction may also be applied to the other embodiments in a similar manner.

Meanwhile, although in the above-described embodiments the partition member 16 has been described as being mounted on the revolving frame 5 by using the mounting frame 15, the partition member 16 is sufficient if it is able to partition between the engine side space 17 and the pump side space 18 as a firewall, and the partition member 16 may be mounted on a member other than the mounting frame 15. Namely, a configuration may be provided such that, for example, a downwardly extending bracket is provided on the bottom plate portion 16A of the partition member 16, and this bracket is fixed to the revolving frame 5. In this case, the mounting frame 15 including the frame portion 15A can be made unnecessary.

Furthermore, in the respective embodiments a description has been given by citing as an example the case in which the exhaust gas purifying device 20, 41, or 51 is installed in the hydraulic excavator 1 equipped with the crawler type lower traveling structure 2. However, the present invention is not limited to this particular example, and it is possible to adopt a configuration in which the exhaust gas purifying device is installed in a hydraulic excavator equipped with a wheel type lower traveling structure consisting of tires and the like. In addition to these, the present invention may be extensively applied to a lift truck, a hydraulic crane, a bulldozer, and the like insofar as they are construction machines equipped with engines.

The invention claimed is:

1. A construction machine comprising an automotive vehicle body, an engine mounted on said vehicle body, a hydraulic pump provided on one longitudinal side of said engine, and an exhaust gas purifying device connected to said engine through an exhaust pipe to purify exhaust gas, and said exhaust gas purifying device comprising an upstream cylinder connected to said exhaust pipe, a downstream cylinder disposed downstream of said upstream cylinder to emit the exhaust gas, a filter cylinder provided between said upstream cylinder and said downstream cylinder and accommodating a filter for trapping particulate matter contained in the exhaust gas, an upstream side pressure conduit mounted on said upstream cylinder to guide pressure within said upstream cylinder to an outside, a downstream side pressure conduit mounted on said downstream cylinder to guide pressure within said downstream cylinder to the outside, and a pressure sensor connected to these conduits to detect the front and rear pressures of said filter, said construction machine characterized in that:

said upstream cylinder and said downstream cylinder are fixedly provided on said vehicle body, said filter cylinder is provided mountably and dismountably with respect to said upstream cylinder and said downstream cylinder, and said upstream side pressure conduit, said downstream side pressure conduit and said pressure sensor are arranged to be disposed at positions offset from a moving path which is used when said filter cylinder is dismounted from said upstream cylinder and said downstream cylinder and is moved to another location or is returned from the other location and is remounted thereto so as to perform maintenance operation of said filter cylinder.

2. A construction machine according to claim 1, wherein said vehicle body is provided with a partition member for partitioning between an engine side space formed on a side of said engine and a pump side space formed on a side of said hydraulic pump so as to prevent hydraulic oil from scattering from said pump side space to said engine side space, said exhaust gas purifying device being disposed in said engine side space partitioned by said partition members, and said moving path for moving said filter cylinder being arranged to be formed between said partition member and said engine.

3. A construction machine according to claim 2, wherein said partition member is disposed so as to extend vertically, and said moving path for moving said filter cylinder is arranged to be formed by a vertical space between said partition member and said engine.

4. A construction machine according to claim 1, wherein said engine is provided with a support member for mounting said exhaust gas purifying device, said upstream cylinder and said downstream cylinder are fixedly mounted on said support member in a state in which an insertion space for said filter cylinder is secured, and said pressure sensor is arranged to be mounted on said support member at the position offset from said moving path of said filter cylinder.

5. A construction machine according to claim 1, wherein said pressure sensor is arranged to be mounted on either one of said upstream cylinder and said downstream cylinder at the position offset from said moving path of said filter cylinder.

6. A construction machine according to claim 1, wherein said upstream side pressure conduit and said downstream side pressure conduit are arranged to be provided along outer peripheral sides of said upstream cylinder, said filter cylinder and said downstream cylinder at the positions offset from said moving path of said filter cylinder.

7. A construction machine according to claim 1, wherein said vehicle body is provided with a partition member for partitioning between an engine side space formed on a side of said engine and a pump side space formed on a side of said hydraulic pump so as to prevent hydraulic oil from scattering from said pump side space to said engine side space, and said partition member is formed by a bottom plate portion extending over an upper side of said hydraulic pump in a direction away from said engine and a vertical plate portion extending upward from that end portion of said bottom plate portion which is located away from said engine, and wherein said engine is provided with a support member for supporting said exhaust gas purifying device, and said support member is formed by a mounting portion which is fixed to said engine and a purifying device supporting portion extending from said mounting portion in a direction away from said engine over an upper side of said bottom plate portion of said partition member, said exhaust gas purifying device being mounted on said purifying device supporting portion of said support member, said moving path being formed in said engine side space between said vertical plate portion of said partition member and said engine, and said pressure sensor being arranged to be mounted on any one of said support member, said upstream cylinder, and said downstream cylinder at the position offset from said moving path of said filter cylinder.

8. A construction machine according to claim 7, wherein there is provided a mounting frame provided on said vehicle body to dispose said partition member above said hydraulic pump, said mounting frame is constituted by a rectangular frame portion for holding said partition member from therearound and a plurality of leg portions extending downward from said frame portion and fixed to said vehicle body, and said moving path is in a range surrounded by said frame portion of said mounting frame.

* * * * *